US008706137B2

(12) United States Patent
Sridhara et al.

(10) Patent No.: US 8,706,137 B2
(45) Date of Patent: Apr. 22, 2014

(54) LIKELIHOOD OF MOBILE DEVICE PORTAL TRANSITION

(75) Inventors: Vinay Sridhara, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/196,178

(22) Filed: Aug. 2, 2011

(65) Prior Publication Data
US 2013/0035110 A1    Feb. 7, 2013

(51) Int. Cl.
*H04M 11/04* (2006.01)
*H04M 3/493* (2006.01)
*H04W 4/02* (2009.01)
*H04W 4/04* (2009.01)
*H04W 64/00* (2009.01)

(52) U.S. Cl.
CPC .............. *H04W 4/028* (2013.01); *H04W 4/043* (2013.01); *H04W 64/00* (2013.01)
USPC .................... 455/456.1; 455/404.2; 455/414.2

(58) Field of Classification Search
CPC ..... H04W 48/16; H04W 4/021; H04W 4/028; H04W 4/043; H04W 64/00; G01C 21/206; G01S 5/0252; G01S 5/0294
USPC ......... 455/456.3, 414.1, 404, 414.2; 707/765, 707/830; 345/641; 701/400, 409, 467
See application file for complete search history.

(56) References Cited

U.S. PATENT DOCUMENTS

| | | | |
|---|---|---|---|
| 6,397,976 B1 | 6/2002 | Hale et al. | |
| 6,904,358 B2 | 6/2005 | Nohara et al. | |
| 7,272,394 B2 | 9/2007 | Krishnakumar et al. | |
| 7,532,113 B2 * | 5/2009 | Horvitz et al. | 340/539.13 |
| 7,783,302 B2 * | 8/2010 | Hupp et al. | 455/456.1 |
| 2008/0200183 A1 | 8/2008 | Voyer et al. | |
| 2009/0043504 A1 | 2/2009 | Bandyopadhyay et al. | |
| 2009/0325606 A1 * | 12/2009 | Farris | 455/456.3 |
| 2010/0008337 A1 | 1/2010 | Bajko | |
| 2010/0130230 A1 | 5/2010 | Aggarwal et al. | |
| 2010/0287178 A1 * | 11/2010 | Lambert et al. | 707/765 |

OTHER PUBLICATIONS

IEEE 802.11u 2011, Part 11: Wireless LAN Medium Access Control (MAC)and Physical Layer (PHY) Specifications, Amendment 9: Interworking with External Networks, Feb. 2011, Chapter 10 (Layer management), Chapter 11 (MLME).

(Continued)

*Primary Examiner* — Nizar Sivji
(74) *Attorney, Agent, or Firm* — Berkeley Law & Technology Group, LLP

(57) ABSTRACT

The subject matter disclosed herein may relate to methods, apparatuses, systems, devices, articles, or means for conditionally performing a scan responsive to a likelihood of a portal transition, etc. For certain example implementations, a method for a mobile device may comprise determining an indication of a likelihood that a position of the mobile device is transitioning from a first area identifiable by a first location context identifier to a second area identifiable by a second location context identifier via a portal linking the first area and the second area; and conditionally performing a scan for signals transmitted by one or more transmitter devices corresponding to the second area responsive to the indication of the likelihood that the position of the mobile device is transitioning to the second area via the portal. Other example implementations are described herein.

50 Claims, 9 Drawing Sheets

(56) References Cited

OTHER PUBLICATIONS

IEEE P802.11v/D6.0, May 2009, Draft Standard for Information technology—Telecommunications and information exchange between systems—Local and metropolitan area networks—Specific requirements, Part 11: Wireless LAN Medium Access Control (MAC) and Physical Layer (PHY) specifications, Amendment 8: Wireless Network Management, Chapter 10 (Layer management), Chapter 11 (MLME).

Woodman et al., Pedestrian Localisation for Indoor Environments, UbiComp '08, Sep. 21-24, 2008, Seoul, Korea, pp. 114-123.

Turgut et al., A Multi-Hypothesis Particle Filter for Indoor Dynamic Localization, The 5th IEEE International Workshop on Performance and Management of Wireless and Mobile Networks (P2MNET 2009), Zurich, Switzerland, Oct. 20-23, 2009, pp. 742-749.

\* cited by examiner

LIKELIHOOD OF MOBILE DEVICE PORTAL TRANSITION

BACKGROUND

1. Field

The subject matter disclosed herein relates to a likelihood of a mobile device portal transition and more specifically, but by way of example only, to an indication of a likelihood that a position of a mobile device is transitioning from a first area to a second area via a portal linking the first area and the second area.

2. Information

It can be a struggle to journey from one point to another. In ancient times, individuals in unfamiliar territory often wandered around without guidance, or perhaps they risked asking local inhabitants for directions. Eventually people developed maps to provide written guidance for reaching a desired destination. As literacy and the availability of paper became more common, more people gained the ability to use maps during their travels.

Maps began to be available in electronic form during the twentieth century. With the advent of the Internet, people could electronically access maps of many places from all over the globe. Web mapping services could also provide directions from point "A" to point "B". These directions from web-based mapping services were relatively static. With the invention of satellite-positioning system (SPS) technology and ever-smaller electronic devices, however, so-called turn-by-turn directions could be provided dynamically as travelers journeyed toward their destination.

These electronic maps and web-based mapping services focus on providing directions in certain situations and in particular environments. Unfortunately, there are other situations or different environments for which they are not intended and have not been designed. Consequently, there remain a number of situations, environments, etc. in which navigational or other location-based services may be improved.

BRIEF DESCRIPTION OF THE FIGURES

Non-limiting and non-exhaustive aspects, features, etc. will be described with reference to the following figures, wherein like reference numerals may refer to like parts throughout the various figures.

SUMMARY

Figure 1:
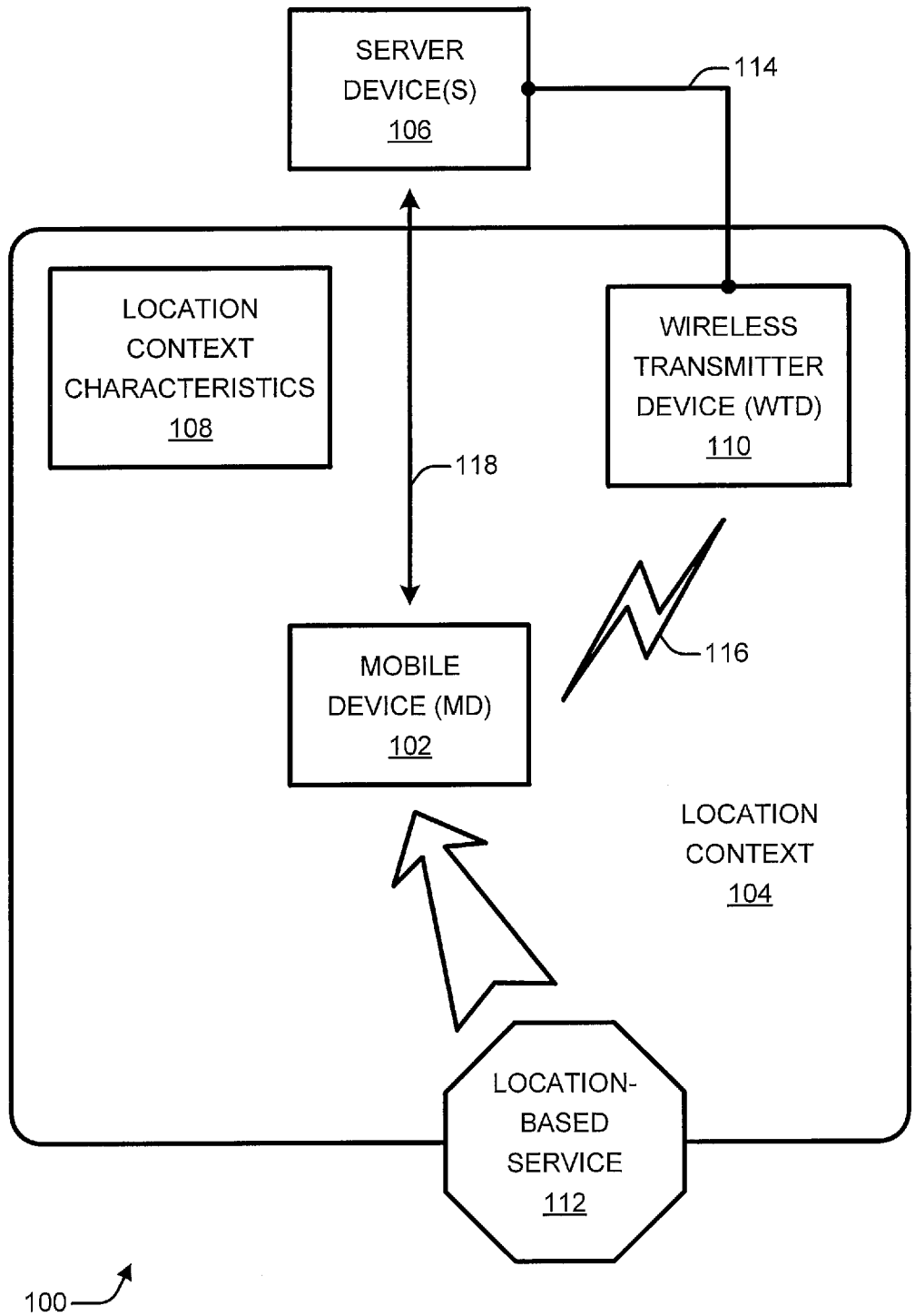
FIG. 1 is a schematic block diagram illustrating a mobile device within an example location context in which the mobile device may be provided a location-based service via access to a wireless transmitter device according to an implementation.

For certain example implementations, a method for a mobile device may comprise: determining an indication of a likelihood that a position of the mobile device is transitioning from a first area identifiable by a first location context identifier to a second area identifiable by a second location context identifier via a portal linking the first area and the second area; and conditionally performing a scan for signals transmitted by one or more transmitter devices corresponding to the second area responsive to the indication of the likelihood that the position of the mobile device is transitioning to the second area via the portal. For certain example implementations, a mobile device for using a likelihood of a portal transition may comprise: at least one memory to store instructions; and one or more processors to execute said instructions to: determine an indication of a likelihood that a position of the mobile device is transitioning from a first area identifiable by a first location context identifier to a second area identifiable by a second location context identifier via a portal linking the first area and the second area; and conditionally perform a scan for signals transmitted by one or more transmitter devices corresponding to the second area responsive to the indication of the likelihood that the position of the mobile device is transitioning to the second area via the portal. For certain example implementations, a mobile device for using a likelihood of a portal transition may comprise: means for determining an indication of a likelihood that a position of the mobile device is transitioning from a first area identifiable by a first location context identifier to a second area identifiable by a second location context identifier via a portal linking the first area and the second area; and means for conditionally performing a scan for signals transmitted by one or more transmitter devices corresponding to the second area responsive to the indication of the likelihood that the position of the mobile device is transitioning to the second area via the portal. For certain example implementations, an article may comprise: at least one storage medium having stored thereon instructions executable by one or more processors to: determine an indication of a likelihood that a position of a mobile device is transitioning from a first area identifiable by a first location context identifier to a second area identifiable by a second location context identifier via a portal linking the first area and the second area; and conditionally perform a scan for signals transmitted by one or more transmitter devices corresponding to the second area responsive to the indication of the likelihood that the position of the mobile device is transitioning to the second area via the portal. It should be appreciated, however, that these are merely example implementations and that other implementations are described herein and may be implemented without departing from claimed subject matter.

For certain example implementations, a method may comprise: determining for a likelihood heat map one or more indications of one or more likelihoods of transitions from a first area identifiable by a first location context identifier to a second area identifiable by a second location context identifier via one or more portals based, at least in part, on one or more features of a map of the first area and one or more locations of the one or more portals, wherein the likelihood heat map enables a determination of a particular likelihood that a mobile device transitions from the first area to the second area via a particular portal of the one or more portals based, at least partly, on a current position of the mobile device in the first area.

DETAILED DESCRIPTION

Reference throughout this Specification to "a feature," "one feature," "an example," "one example," and so forth means that a particular feature, structure, characteristic, or aspect, etc. that is described in connection with a feature or example may be relevant to at least one feature or example of claimed subject matter. Thus, appearances of a phrase such as "in one example," "for example," "in one feature," "a feature," "a particular feature," "in an example implementation," or "for certain example implementations," etc. in various places throughout this Specification are not necessarily all referring to the same feature, example, or example implementation. Furthermore, particular features, examples, structures, characteristics, or aspects, etc. may be combined in one or more example devices, example methods, example apparatuses, or other example implementations.

Many indoor environments are sufficiently large, complex, or otherwise difficult to navigate so that navigational services may be beneficial, e.g., to a user of a mobile device. Hence, a user may want a navigational service, which may involve maps or directions, etc., or another location-based service (LBS) to be provided via a mobile device in an indoor area. Unfortunately, in contrast with large-scale, outdoor areas in which maps or mobile device locations may be made available via e.g. satellite imagery or satellite positioning system (SPS) technologies, indoor maps or mobile device positions are often not as readily available. Satellites cannot merely photograph interior features of a structure, or SPS signals may be too attenuated for use within a structure.

Location-based services may include positioning, personal vehicle/pedestrian navigation, mapping, static directions, real-time turn-by-turn directions, or location-based searching (e.g., searching of local points of interest), just to name a few examples. To provide location-based services indoors, one or more local coordinate systems may be established for particular indoor areas. An indoor area, for example, may be referred to as a "location context." A mobile device or a server device may store or associate location context identifiers (LCIs) with specific "location contexts." A location context may comprise, by way of example but not limitation, a locally-defined environment or other area such as, for example, a particular floor of a building or another indoor area that may not be mapped according to a global coordinate system. A given indoor area or other location context may be associated with at least a portion of at least one local coordinate system, at least a portion of at least one global coordinate system, at least a portion of at least one local coordinate system that may be translated into one or more other local coordinate systems or global coordinate systems, or any combination thereof, etc., just to name a few examples. However, claimed subject matter is not limited to any particular coordinate system or systems or to any particular location context.

A location context identifier may be used to identify at least one location context. A location context identifier may comprise, by way of example but not limitation, one or more alphabetical characters, one or more numerical characters, or combinations thereof, etc. However, claimed subject matter is not limited to any particular implementation for a location context identifier. A location context identifier may be associated with at least one location context. A location context identifier may also or alternatively be associated with one or more wireless transmitter devices, e.g., of a location context. For example, if a particular location context identifier is associated with a particular location context, the particular location context identifier may also be associated with at least one wireless transmitter device corresponding to the particular location context. At least one particular wireless transmitter device may correspond to the particular location context if it is physically located at the particular location context, if it emanates signals that are receivable by a mobile device that is physically located at the particular location context, or any combination thereof, etc., just to name a couple of examples.

A wireless transmitter device may be associated with at least one identity. For an example Wi-Fi access point (AP) implementation of a wireless transmitter device, an identity may comprise a medium access control identifier (MAC ID) of the Wi-Fi AP. A signal may be received from a Wi-Fi AP or demodulated to acquire a MAC ID. However, claimed subject matter is not limited to any particular form of identity for a wireless transmitter device. A device, such as a server device or a mobile device, may store one or more location context identifiers in association with at least one location context or in association with at least one wireless transmitter device. These may be stored, by way of example only, using one or more databases. If an identity of a wireless transmitter device is ascertained, a location context identifier that is associated with the ascertained wireless transmitter device identity may be determined from stored associations of wireless transmitter device identities or location context identifiers. With a determined location context identifier, a location context that is associated with the determined location context identifier may be determined from stored associations of location context identifiers or location contexts. For certain example implementations, an identity of at least one wireless transmitter device may be used to determine an associated location context identifier, or a location context identifier may be used to determine an associated location context. Additionally or alternatively, wireless transmitter device identities may be associated with or stored in association with location contexts. In certain example implementations, an identity of at least one wireless transmitter device may be used to determine an associated location context. A particular location context may comprise, by way of example but not limitation, a particular indoor area, a particular floor of a building, any combination thereof, etc.

Location context identifiers may be used as handles for requesting location context characteristics, which may be descriptive of a location context. Location context characteristics may, by way of example only, (i) include at least a portion of a schematic map of a location context or (ii) be laid over or linked to at least part of a schematic map of a location context. Location context characteristics for an indoor area implementation may include, by way of example but not limitation, at least a portion of any one or more of the following: a schematic map of an indoor area, a connection or routing graph for an indoor area, routes or paths over a schematic map, points of interest that are local or unique to one or more indoor areas, locations of wireless transmitter devices of an indoor area, identities of wireless transmitter devices of an indoor area, or any combination thereof, etc., just to name a few examples. However, claimed subject matter is not limited to any particular examples of content comprising characteristics that may be descriptive of a location context.

A mobile device may use at least one location context identifier to obtain a schematic map of an indoor area or identification of wireless transmitter devices of an indoor area, for example. By way of example only, a mobile device may send a request including or otherwise specifying a location context identifier to a server device storing or otherwise having access to location context characteristics. Additionally or alternatively, a mobile device may use a particular location context identifier to obtain characteristics corresponding to particular location context that is to be used in an application connected to the particular location context. For example, a mobile device may obtain particular location context characteristics for use in an indoor pedestrian navigation application that is operable in connection with the particular location context. Such obtained characteristics may include a schematic map that provides or enables a display of, for example, corridors, rooms, hallways, doors, entry ways, restrooms, portals between different areas, points of interest, or any combination thereof, etc. of an indoor area. A schematic map for an indoor area may be used to facilitate navigation within an indoor area. For an example navigational application, metadata corresponding to a schematic map may define a routing topology set out in a coordinate system that is local to a particular location context, as distinguishable from a global coordinate system.

A mobile device may also use one or more location context identifiers to obtain point of interest (POT) features for a given indoor area of a particular location context. POT features may include, by way of example only, description or identification of particular locations or potential destinations of an indoor area. Examples of POT features may include, but are not limited to, names of stores; locations of restrooms; names of office inhabitants; locations of copier or break rooms; purposes of rooms; identifications of stairs, escalators, or elevators; identifications of points of ingress or egress; or any combination thereof; etc.

Use of characteristics that are descriptive of a location context may depend, at least partially, on a position of a mobile device within an indoor area. Unfortunately for users located within indoor environments, as is explained further below, performing a positioning operation to estimate a position of a mobile device may be more difficult indoors as compared to outdoors.

As indicated above, electronic mapping or other navigational services in outdoor environments may be effectuated using positioning fixes obtained via SPS signals or using signals transmitted from one or more terrestrial cellular base stations or similar fixed outdoor transmitting stations. With indoor environments, on the other hand, SPS signals may often be too weak or undetectable. Likewise, there may be too few received signals or an insufficient strength of signals received at an indoor location with regard to signals that are transmitted from terrestrial base stations. Consequently, positioning strategies that are effective in outdoor environments may be inadequate for indoor environments. To combat these difficulties, indoor positioning for mobile devices may be effectuated at least partly by processing signals transmitted from wireless transmitter devices that are located, for example, within an indoor environment. Wireless transmitter devices may include, but are not limited to, wireless transmitters that comport with a Wi-Fi AP protocol (e.g., IEEE 802.11), a Bluetooth protocol, a femtocell protocol, or any combination thereof, etc.

To employ a wireless transmitter device for a floor determination operation, a mobile device may use an estimated location or an identity of a wireless transmitter device. An identity of a wireless transmitter device may be ascertained by receiving or demodulating at least one signal from a wireless transmitter device. Reception or demodulation of signals may consume resources. Resources that are consumed may include, by way of example only, time, power, bandwidth, or any combination thereof, etc. If a mobile device performs a scanning operation to ascertain an identity of a wireless transmitter device, additional resources may be consumed as multiple signals, which may be propagating on multiple frequencies, are received or demodulated. For example, a finite amount of time may elapse while a mobile device is scanning transmissions to identify a wireless transmitter device. Also, battery life may be consumed to power reception and processing of signals emanating from wireless transmitter devices. Furthermore, at least a portion of available wireless bandwidth may be consumed by scanning to receive or demodulate signals that are emanating from wireless transmitter devices in order to provide indications of their identity.

Consequently, resources may be conserved if an identity of a wireless transmitter device that is within range of a mobile device may be ascertained with a reduced amount of scanning, including no scanning, of a wireless spectrum. For certain example implementations, at least some amount of resources that are consumed by scanning for signals emanating from wireless transmitter devices may be reduced. An amount of resources that are consumed may be reduced, by way of example but not limitation, in terms of time, power, bandwidth, processing, or any combination thereof, etc. An amount of scanning may be reduced if a portion of wireless spectrum to be scanned is reduced, if a number of signals to be received or demodulated is reduced, if relevant wireless transmitter device identities are known, if one or more operating channels of wireless transmitter devices are known, if one or more MAC addresses of wireless transmitter devices are known, or any combination thereof, etc., just to name a few examples.

Different types of scanning may be performed in different manners. Examples of scanning types may include, but are not limited to, a directed probe scan, a passive scan, a full passive scan, or any combination thereof, etc. If one or more identities of wireless transmitter devices that are likely to be in range are known, a mobile device may direct its scanning to these known wireless transmitter devices or exclude scanning for other wireless transmitter devices in order to perform a directed probe scan. If no identities are known, a mobile device may systematically scan for any wireless transmitter devices that are in range in order to perform a passive scan, e.g., across at least a predetermined portion of spectrum, across at least a portion of a range of available channels, or any combination thereof, etc. If no identities are known, a mobile device may alternatively systematically scan for any wireless transmitter devices that are in range in order to perform a full passive scan, e.g., across a full predetermined portion of spectrum, across a full range of available channels, or any combination thereof, etc. For instance, a full passive scan in accordance with IEEE 802.11 may consume approximately 1.2 seconds. In contrast, a directed probe scan, which may be performed if at least some information (e.g., an identity) relating to proximate wireless transmitter devices is known, may consume approximately 20 milliseconds.

In example implementations (e.g., including but not limited to IEEE 802.11-related implementations), a scanning may be based, at least partly, on a type or amount of wireless transmitter device characteristics that are known. Such wireless transmitter device characteristics may include, but are not limited to, MAC addresses of transmitters that can be used for positioning or that are known to be in a vicinity of a mobile device, channels in which transmitters are operating or channel information in which transmitters are operating (e.g., channels 1, 6, and 11, but not other channels), or any combination thereof, etc. If, by way of example only, channel information is known (e.g., but not MAC addresses of transmitters), a subset passive scan may be performed that is limited to these known channels. If, by way of example only, MAC addresses are known (e.g., but not their current operating channels), then a directed-probe-based active scan may be performed. If both MAC addresses and channels are known, by way of example only, then a packet exchange may be conducted to obtain indications related to signal strength, time of flight, any combination thereof, etc. If neither MAC addresses nor operating channels are known, then a full passive scan spanning each of known operating channels may be performed to obtain identities of wireless transmitter devices.

For certain example implementations, a mobile device may determine an indication of a likelihood that a position of the mobile device is transitioning from a first area identifiable by a first location context identifier to a second area identifiable by a second location context identifier via a portal linking the first area and the second area. Responsive to the indication of the likelihood that the position of the mobile device is transitioning from the first area to the second area via the portal, conditionally performing a scan for signals transmitted by one or more transmitter devices corresponding to the second area. In example implementations, a scan for signals transmitted by one or more transmitter devices corresponding to a second area may be performed based, at least in part, on a comparison including an indication of a likelihood that a position of a mobile device is transitioning from a first area to the second area and a predetermined transition likelihood threshold.

A portal enabling a transition between or linking a first area and a second area may comprise an escalator, a stairway, or an elevator, etc., just to name a few examples. For certain example implementations, a type of scan for one or more wireless transmitter devices may depend at least partially on a type of portal taken by a user of a mobile device to transition between areas. In example implementations, power for a mobile device may be managed if a portal taken by a user of a mobile device is an elevator. In example implementations, a location context identifier associated with an area may be ascertained based on any one or more of a number of different factors, which are described herein below.

An indication of a likelihood that a position of a mobile device is transitioning from a first area to a second area via a portal linking the first area and the second area may be determined based, at least in part, on at least one likelihood heat map. For certain example implementations, a likelihood heat map that is indicative of a likelihood that a mobile device is to take a portal to a different area (e.g., a different floor of a building) may be determined based, at least in part, on one or more features of a map of an area and one or more locations of one or more portals of the area as indicated on the map. A likelihood heat map may comprise a static likelihood heat map, a dynamic likelihood heat map, or a combined static and dynamic likelihood heat map, etc. Example implementations for likelihood heat maps are described further herein below. However, claimed subject matter is not limited to any of these particular example implementations. Moreover, additional example implementations for likelihoods of mobile device portal transitions are described further herein below.

FIG. 1 is a schematic block diagram 100 illustrating a mobile device within an example location context in which the mobile device may be provided a location-based service via access to a wireless transmitter device according to an implementation. As illustrated, schematic block diagram 100 may include a mobile device 102 that is located within a location context 104, such as an indoor area. Schematic block diagram 100 may further include one or more server devices 106, one or more location context characteristics 108, at least one wireless transmitter device 110, or at least one location-based service 112. At least one wired 4communication link 114, at least one wireless communication link 116, and an arrow 118 are also shown in schematic block diagram 100.

For certain example implementations, a mobile device 102 may obtain at least a portion of location context characteristics 108 from one or more server devices 106. Upon receipt of location context characteristics 108, mobile device 102 may store location context characteristics 108 in one or more memories for use in providing at least one location-based service 112, e.g., for a user of mobile device 102. A location-based service 112 may include, by way of example only, a positioning operation or a procedure that may be facilitated using a position resulting from a positioning operation (e.g., a navigation procedure), as is described further herein below.

Examples of mobile devices 102 may include, but are not limited to, a mobile phone, a mobile station, a user equipment, a cellular phone, a netbook, a laptop, a tablet computer, a slate computer, a personal digital assistant (PDA), a personal navigation device (PND), an entertainment appliance, an e-book reader, or some combination thereof, etc., just to name a few examples. Furthermore, a mobile device 102 may comprise any mobile device with wireless communication capabilities. Example realizations for a mobile device, as well as additional mobile device examples, are described herein below with particular reference to FIG. 9. However, claimed subject matter is not limited to any particular type, size, category, capability, etc. of a mobile device.

In example implementations, location context 104 may comprise one or more indoor areas such as office buildings, shopping malls, airports, apartment buildings, arenas, convention centers, auditoriums, amphitheaters, warehouses, classroom buildings, supermarkets, stadiums, a transit station terminal, a library, one or more floors thereof, interiors of other structures, or any combination thereof, just to name a few examples. In example implementations, location context characteristics 108 may be descriptive of a location context 104 or may facilitate provision of a location-based service 112 in conjunction with mobile devices 102 that are located within a corresponding location context 104. By way of example but not limitation, location context characteristics 108 may include at least a portion of one or more of any of the following: a schematic map, a connectivity graph for a schematic map, a routing graph for a schematic map, annotation information for a schematic map, a likelihood heat map, locations of wireless transmitter devices, identities of wireless transmitter devices, points of interest for an indoor area, navigational instructions, at least one probability model, or any combination thereof, etc. Additional description and examples of location context characteristics 108, such as a schematic map, a graph, a likelihood heat map, etc., are described herein below with particular reference to FIG. 3.

In example implementations, a wireless transmitter device 110 may comprise a Wi-Fi and/or wireless local area network (WLAN) AP, a femtocell nodal device, a WiMAX nodal device, a location beacon, a Bluetooth or other similarly short-ranged wireless node, or any combination thereof, etc., just to name a few examples. Wireless transmitter devices 110 may transmit signals including, but not limited to, those capable of identifying a particular wireless access device or those that may be useful for estimating a position of a mobile device. A mobile device 102 may be within wireless communication range of one or more wireless transmitter devices 110 and thus in wireless communication with one or more wireless transmitter devices 110. A wireless transmitter device 110 may also be capable of receiving wireless signals or may comprise a wireless access device generally that is capable of transmitting and receiving wireless signals. A wireless transmitter device 110 may be located such that it corresponds to or is communicating within a single location context 104 or multiple location contexts 104. During wireless communication(s), a mobile device 102 may receive from one or more wireless transmitter devices 110 one or more wireless transmitter device identifiers that are respectively associated with the one or more wireless transmitter devices 110. For a Wi-Fi AP implementation of a wireless transmitter device 110, by way of example but not limitation, a wireless transmitter device identifier may comprise an AP MAC ID. Such a wireless transmitter device 110 may further interact with a mobile device 102 so as to enable measurements, such as round trip time (RTT) measurements, round trip delay (RTD) measurements, or received signal strength indicator or indication (RSSI) measurements, etc., just to name a few examples.

In example implementations, a server device 106 may include or comprise at least one electronic device, such as a device with processing capabilities. Server device 106 may comprise, for example, any electronic device having at least one processor or memory. Examples of server devices 106 may include, but are not limited to, a desktop computer, one or more server blades, at least one server machine, a server farm, at least one telecommunications node, an intelligent router or switch, an access point, or any combination thereof, etc.

As depicted in schematic block diagram 100, one or more server devices 106 may be located external to location context 104. However, one or more server devices 106 may alternatively be located fully or partially internal to location context 104 without departing from claimed subject matter. Similarly, although wireless transmitter device 110 is illustrated as being located internal to location context 104, it may alternatively be located fully or partially external to location context 104 without departing from claimed subject matter. Although only one server device 106 and wireless transmitter device 110 are explicitly shown in schematic block diagram 100, more or less than one of either or both may alternatively be involved in a given implementation without departing from claimed subject matter. Examples of location-based services 112 may include, but are not limited to, displaying a map, determining a position or positioning, personal vehicle or pedestrian navigation, providing "static" directions, providing real-time turn-by-turn directions, location-based searching (e.g., searching of local points of interest), or any combination thereof, etc.

Figure 2:
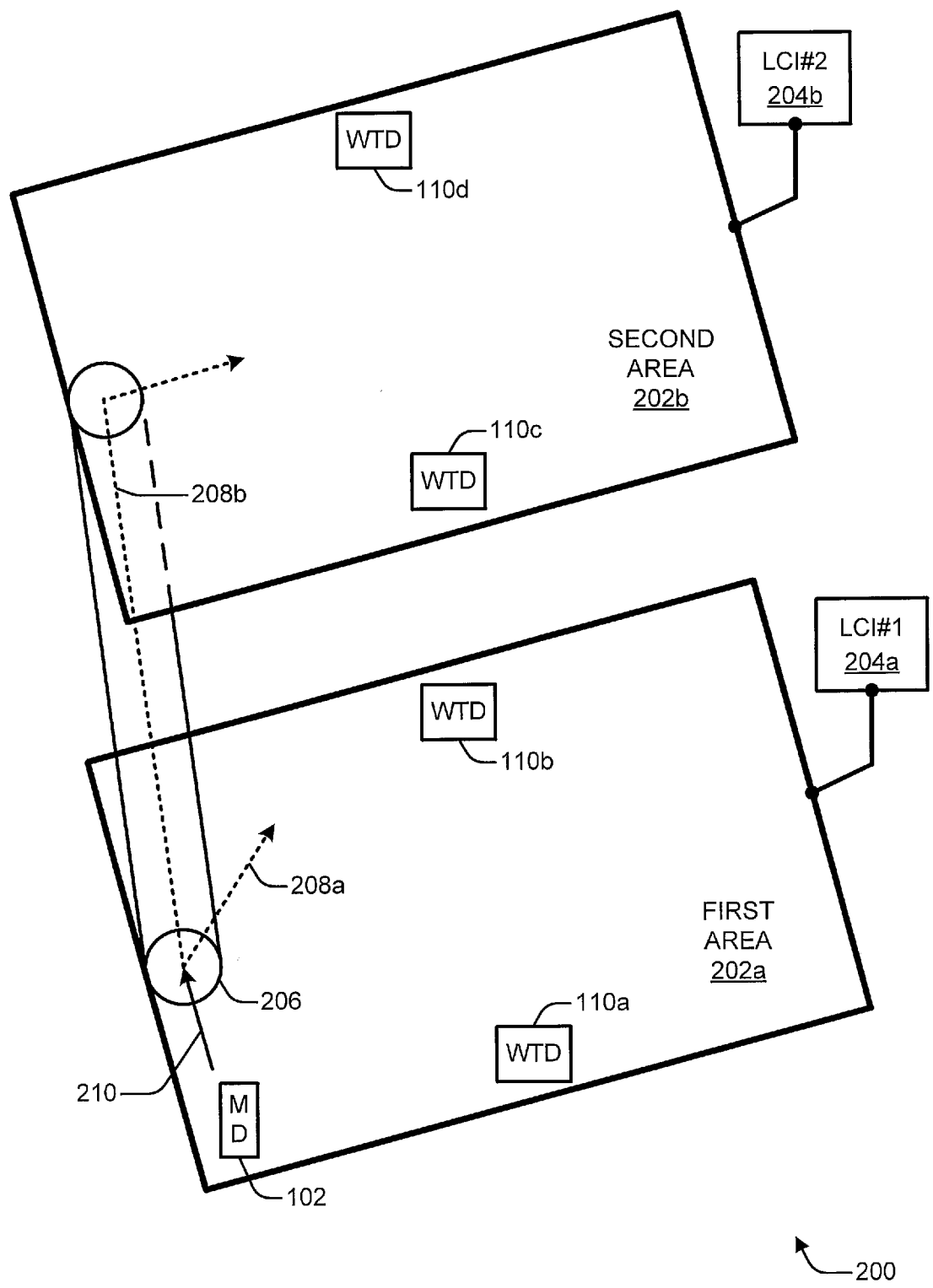
FIG. 2 is a schematic diagram illustrating a first area and a second area that may be linked via at least one portal according to an implementation.

FIG. 2 is a schematic diagram 200 illustrating a first area and a second area that may be linked via at least one portal according to an implementation. As illustrated, schematic diagram 200 may include a first area 202a, a second area 202b, a first location context identifier 204a, a second location context identifier 204b, at least one portal 206, a first potential path 208a, a second potential path 208b, or an arrow 210. Schematic diagram 200 may further include a mobile device 102, a wireless transmitter device 110a, a wireless transmitter device 110b, a wireless transmitter device 110c, or a wireless transmitter device 110d. Although only one portal 206 and four wireless transmitter devices 110a,b,c,d are explicitly shown in FIG. 2, there may alternatively be different numbers of either or both.

For certain example implementations, first location context identifier 204a may be associated with first area 202a. First area 202a may be identifiable by first location context identifier 204a. Second location context identifier 204b may be associated with second area 202b. Second area 202b may be identifiable by second location context identifier 204b. Wireless transmitter device 110a or wireless transmitter device 110b may be located within or otherwise correspond to first area 202a. Wireless transmitter device 110c or wireless transmitter device 110d may be located within or otherwise correspond to second area 202b. A correspondence of wireless transmitter device 110a or wireless transmitter device 110b to first area 202a may be indicated by first location context identifier 204a. A correspondence of wireless transmitter device 110c or wireless transmitter device 110d to second area 202b may be indicated by second location context identifier 204b. Portal 206 may enable a user (not explicitly shown) of mobile device 102 to transition from first area 202a to second area 202b, or vice versa.

Mobile device 102 may be currently located at first area 202a. In an example implementation, mobile device 102 may be capable of communicating with at least wireless transmitter device 110a or wireless transmitter device 110b while mobile device 102 is currently located at first area 202a. If mobile device 102 were currently located at second area 202b, mobile device 102 may be capable of communicating with at least wireless transmitter device 110c or wireless transmitter device 110d. Hence, an ability to communicate with certain wireless transmitter device(s) 110, or measurements taken with respect to communications with certain wireless transmitter device(s) 110, may indicate an area 202 in which a mobile device is currently located. Detection or identification of a wireless transmitter device may therefore be used for area (e.g., floor) determination. However, as indicated above, scanning for wireless transmitter devices 110 generally consumes resources.

In an example implementation, mobile device 102 may be moving around first area 202a. Mobile device 102 may be in communication with wireless transmitter device 110a or wireless transmitter device 110b to facilitate performance of positioning operations to estimate a position of mobile device 102 (e.g., to provide location-aware mapping services, or direction services, etc.). As depicted by arrow 210, a recent trajectory or path of mobile device 102 indicates that mobile device is becoming proximate to portal 206 or appears to be heading toward portal 206. It may be uncertain as to whether mobile device 102 is to transition from first area 202a to second area 202b via portal 206 or is to veer away from or otherwise bypass portal 206 to remain at first area 202a. As described herein below, an estimated position for mobile device 102 may be propagated probabilistically. As shown in schematic diagram 200, first potential path 208a represents that mobile device 102 may continue at first area 202a, or second potential path 208b represents that mobile device 102 may transition from first area 202a to second area 202b via portal 206.

In conjunction with an example indoor positioning paradigm, mobile devices may determine a floor or other area as part of a localization procedure. Users may move between floors using elevators, escalators, or stairways, etc. to reach a desired POI. When a user initially enters an indoor environment, a mobile device may perform a, e.g., full passive scan to determine if any wireless transmitter device identifiers (e.g., MAC IDs, BSSIDs, etc.) may be detected. Initially-detected identifiers may be used to ascertain a location context identifier that is associated with an indoor area. By way of example only, a mobile device may store a database that links or otherwise associates one or more wireless transmitter device identities to at least one location context identifier, a mobile device may transmit a detected wireless transmitter device identity to and receive from a remote server an associated location context identifier, or any combination thereof, etc. Additional or alternative example implementations for ascertaining an initial location context identifier are described herein below.

As a user moves around within an indoor area while carrying a mobile device, position estimates of the mobile device may be determined using, for example, one or more wireless transmitter devices. Wireless signal measurements, such as RSSI, RTT, RTD, or combinations thereof, etc., may be made by a mobile device with respect to one or more wireless transmitter devices. Using such measurements along with techniques that are known in the art (e.g., trilateration), a position of a mobile device may be estimated. With trilateration, for example, a mobile device may use well known techniques to obtain a position fix from ranges to transmitters at know locations measured from received wireless signal characteristics (e.g., RSSI, RTT, RTD, etc.). Furthermore, a speed or a direction may be estimated using wireless signal measurements, one or more position estimates, or any combination thereof, etc. For instance, an estimated velocity, which may include both a speed and a direction, may be estimated from a trajectory formed by at least two estimated positions that are associated with respective timestamps, such as times at which measurements are taken.

Additionally or alternatively, position estimates, velocities, trajectories, or any combination thereof, etc. of a mobile device may be determined using, for example, one or more inertial navigation techniques. Inertial navigation techniques may be based, at least in part, on inertial measurements obtained from at least one accelerometer, at least one compass, at least one gyroscope, or any combination thereof, etc. Inertial measurement values may include, but are not limited to, one or more accelerations, one or more compass heading directions, one or more orientations, one or more rotations, or any combination thereof, etc. Inertial measurements may be used, by way of example but not limitation, in conjunction with one or more probabilistic mechanisms.

Determination of position estimates of a mobile device or a trajectory of a mobile device within an indoor area may be facilitated or enhanced using one or more probabilistic mechanisms. By way of example but not limitation, a position of a mobile device may be represented as a probability distribution. To reflect or represent a mobile device's movement within a physical indoor area, a probability distribution may be propagated around a schematic map representing the physical indoor area. To implement a probabilistic mechanism, a Bayesian or smoothing filter, by way of example but not limitation, may be applied to position estimates or a process of determining position estimates. Additionally or alternatively, a Kalman filter or particle filtering, by way of example only, may be applied to position estimates or a process of determining position estimates. A probabilistic mechanism may be used, by way of example but not limitation, to predict one or more likely locations of a mobile device. Other probabilistic mechanisms may additionally or alternatively be implemented without departing from claimed subject matter.

With an example particle filtering implementation, by way of example only, a mobile device's positions or possible positions may be represented by multiple particles. Each particle may represent a possible state or position for a mobile device. A single particle or an average (e.g., a centroid, a mean, etc. with an error or confidence range) of particles may be considered a likely position of a mobile device. In response to movement of a mobile device, particles may be propagated according to a probability distribution. Particles may be propagated in accordance with a probability distribution further along a corridor, around a corner, by branching at an intersection, by taking a portal to a different indoor area, or any combination thereof, etc.

A probability distribution may indicate a likelihood that a mobile device is transitioning from a first area to a second area via a portal that is proximate to a current position estimate of a mobile device. If a mobile device is transitioning to a different area via a portal, a relevant location context identifier may change as well. For certain example implementations, probabilities applicable to taking a portal to transition between areas may vary based on any one or more of a number of different factors. For example, if a mobile device is near a staircase at a corner of a building, then a likelihood of taking the stairs to another floor may be higher than a likelihood of retracing a path backwards. Also, if a stairway leads to basement parking or a second floor with additional retail or office space, then a likelihood of taking the stairway to the second floor may be higher than a likelihood of taking the stairway to the basement parking. Furthermore, if a user enters a two-story building (e.g., that has no direct path to a second floor from outdoors) that has a staircase at an entrance, then a likelihood of taking the staircase to a second floor may be approximately equally likely as a likelihood of proceeding farther into the first floor of the building.

For certain example implementations, probabilities may additionally or alternatively be determined according to a route that a user takes to approach a portal or reach a destination. For example, if a mobile device is determined to be transitioning to another area via a portal (e.g., a multi-floor or multi-location-context-identifier routing is being performed), and if portals linking other floors are known, a likelihood of moving to an adjacent floor via the portal may be higher as compared to probabilities for moving to other areas that are feasible, but not necessarily adjacent. If a user approaches a location of a portal, particles may be propagated according to a probability distribution, with a particle filtering implementation for example. If a likelihood of taking a portal is high relative to moving to other nearby feasible positions, then a number of particles propagated into the portal may be denser than for the other nearby feasible positions. If a probability distribution in a portal or at a linked floor meets a given transition threshold (e.g., if a number of particles (i.e., a particle density) in a portal or at a linked floor is greater than a given transition threshold), then a floor determination that may include scanning for wireless transmitter devices may be performed.

Figure 3:
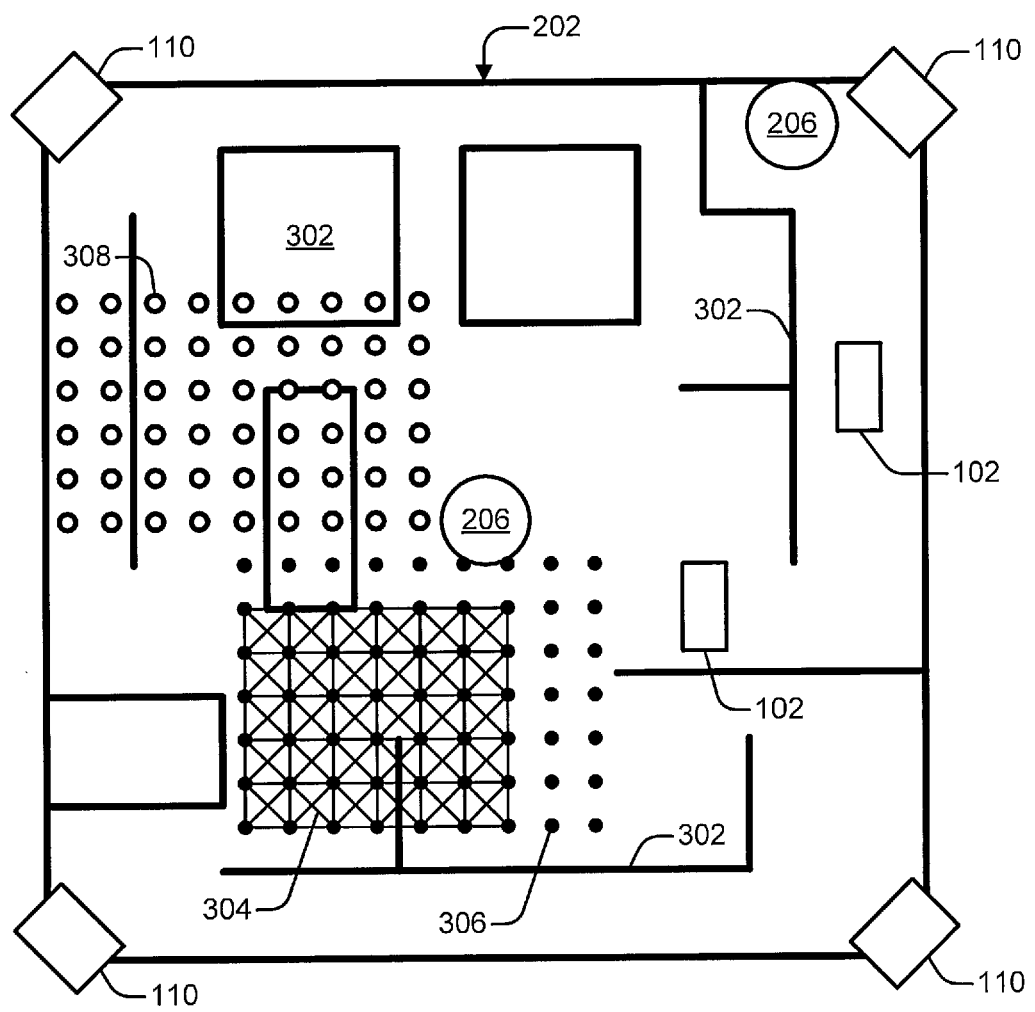
FIG. 3 depicts an example schematic map of an area for which a likelihood heat map may be determined according to an implementation.

FIG. 3 depicts an example schematic map 300 of an area for which a likelihood heat map may be determined according to an implementation. As illustrated, schematic map 300 may be directed to at least one area 202 or may include one or more wireless transmitter devices 110, at least one portal 206, or one or more obstacles 302. Also shown in FIG. 3, by way of example only, are a graph 304, a grid 306 of points, a likelihood heat map 308, and two mobile devices 102. As indicated above, location context characteristics 108 (e.g., of FIG. 1) may include a schematic map, a graph, a likelihood heat map, or any combination thereof, etc., just to name a few examples.

For certain example implementations, schematic map 300 may comprise one or more features that are descriptive of at least one area 202. Features of a map may represent, by way of example but not limitation, attributes of a physical layout or a physical organization of at least one area 202. For example, features of a map may indicate locations or sizes of walls, rooms, doors, hallways, passageways, dividers, railings, portals between areas, obstacles, or any combination thereof, etc., just to name a few examples. A schematic map for an indoor environment may be used to facilitate navigation or floor determination within an indoor environment, for example.

In example implementations, an area 202 may include one or more obstacles 302. Obstacles 302 may include, but are not limited to, walls, doors, railings, or columns; furniture or cubicle dividers; elevators or stairs (e.g., from a routing perspective); or any combination thereof; etc. For the sake of visual clarity in FIG. 3, three obstacles 302 are specifically indicated by reference number, but multiple obstacles are depicted. Obstacles 302 may exist in the physical world and may have corresponding representation(s) included as part of a schematic map 300 of area 202. Although claimed subject matter is not so limited, obstacles 302 may thus include building features or other objects that may restrict movement around an indoor environment. Indoor environments may also have open areas such as lobbies, common areas, entryways, or rooms, etc., just to name a few examples. Accordingly, because paths of movement in such an indoor environment may be restricted in some areas (although they may also be unrestricted in other, open areas), such an indoor environment may be an example of a constrained environment.

Location context characteristics 108 (e.g., of FIG. 1) may further include a graph 304. For certain example implementations, a graph 304 may comprise multiple nodes that are interconnected by edges. To create a graph 304, a grid 306 of points may be overlaid on a schematic map of an indoor area and lines interconnecting the points may be drawn, for example. For the sake of visual clarity for FIG. 3, only a portion of a grid 306 or a graph 304 are explicitly shown. A connectivity graph implementation of a graph 304 may be created, for example, by limiting interconnecting lines to those lines that are capable of extending from one point to another point of a grid 306 of points without crossing an obstacle 302, such as an impervious building feature (e.g., a wall). A routing graph implementation of a graph 304 may comprise a connectivity graph that includes additional map features corresponding to location context 104 (e.g., of FIG. 1) so as to facilitate a determination of a route from one point to another point of area 202.

A connectivity graph or a routing graph may be linked to or otherwise associated with annotations (not separately shown). A connectivity graph, a routing graph, or annotations may be included as part of, may be linked to, or may otherwise be associated with a schematic map 300. Annotations may indicate POI features, as described herein above, or attributes of specific locations or aspects of a schematic map 300 or a physical indoor environment to which it corresponds. However, claimed subject matter is not limited to any particular example implementation of a schematic map, a graph, annotations, or POI features, etc.

A connectivity graph, a routing graph, or annotation information may be used to provide navigational services, such as positioning, providing static directions, providing turn-by-turn directions, or any combination thereof, etc. A navigation service may facilitate travel from a point "A" to a point "B" of e.g. an indoor environment using, for example, a routing graph. A routing graph may be descriptive of feasible areas of a given schematic map and indicate how traversal is possible from one position to another position. For a given indoor environment, a routing graph may comprise a set of nodes and edges that depict feasible areas and traversable paths from one point in an indoor environment to another point. A traversable path may comprise, by way of example but not limitation, a path between any two points that is not blocked by a wall or other obstacle 302. By way of example but not limitation, annotations may be associated with particular portion(s) of a routing graph. A routing graph may be used to plot a path from one point to another point, including from one area to another area via a transition using a portal.

A likelihood heat map 308 may comprise or indicate one or more likelihood values that correspond to one or more positions of an indoor area. A probability distribution or density may, for example, indicate one or more likelihoods of being in a particular state given a previous state. In one particular example, a particular state may be defined at least in part by a, e.g., current or previous position or velocity (e.g., a speed and direction). In another particular example, a particular state may be defined at least in part by a current or previous inertial measurement value. A probability distribution or density may be used to determine likelihood values. A likelihood value may express a likelihood, e.g. in probabilistic terms, that a mobile device 102 is located at or is to transition to a given position based on parameters corresponding to mobile device 102 for at least one prior epoch (e.g., at least an immediately prior epoch). Such parameters may characterize position, speed, direction, inertial movement, or any combination thereof, etc. of a mobile device at an instantaneous moment or over an elapsed time period. Examples of parameters characterizing position or movement of a mobile device may include, but are not limited to, an estimated position, a speed, a direction, a trajectory over an elapsed time period, a path over an elapsed time period, an inertial measurement value, or any combination thereof, etc. By way of example only, a likelihood heat map may correspond to an indoor area and include multiple indications of likelihoods of mobile devices moving to or being located at various positions of the indoor area based, at least in part, on a history of movement or a location history of a mobile device.

A mobile device 102 may use likelihood values of a likelihood heat map 308, by way of example but not limitation, to establish or adjust a position fix. For example, if other positioning techniques or measured values result in a set of likely positions, the set of likely positions may be limited by identifying one or more positions in the set of likely positions having greater likelihood value(s) based, at least in part, on a likelihood heat map 308 as compared to one or more other positions in the set of likely positions. For instance, a mobile device may consider a position, a direction, a speed, an inertial measurement value, or any combination thereof, at a previous moment (e.g., from a previous state) in conjunction with likelihood heat map 308 to determine one or more positions at which the mobile device is more probably positioned at a current moment (e.g., at a current state) or at a subsequent moment (e.g., at a subsequent state). More probable positions that are determined at least partly based on likelihood heat map 308 may be used to limit a set of likely positions of a mobile device.

A likelihood heat map 308 may include a map of an indoor area to which it corresponds. Additionally or alternatively, a likelihood heat map 308 may reference positions that are defined or otherwise specified in a map that is included as part of, e.g., a schematic map. As shown in FIG. 3 merely for purposes of illustration, a likelihood heat map 308 may comprise multiple discrete points that are organized in a grid or other regular arrangement. Additionally or alternatively, a likelihood heat map 308 may comprise likelihood values that are determined based, at least partly, on a irregular or continuous positional basis. By way of example but not limitation, a likelihood heat map 308 may correspond to nodes or edges of a connectivity graph implementation of a graph 304.

However, claimed subject matter is not limited to any particular implementation of a likelihood heat map.

Likelihood values for a likelihood heat map 308 may be determined in any one or more of a number of different manners by at least one server device, by one or more mobile devices, or by any combination thereof, etc. For example, likelihood values for transitioning to another area via a portal may be determined based, at least in part, on distances from portals using a computational analysis. For instance, an estimated position that implies a closer distance to a portal may return a higher likelihood of transitioning via the portal than an estimated position that implies a farther distance to the portal. Alternatively or additionally, likelihood values for transitioning to another area via a portal may be determined based, at least in part, on inertial measurement values of mobile devices that are transitioning from a first area to a second area via a portal. For instance, a mobile device may measure a vertical acceleration that exceeds a predetermined vertical acceleration threshold (e.g., for a predetermine measurement time period threshold) if the mobile device is transitioning between a first area and a second area via a portal. Alternatively or additionally, likelihood values for transitioning to another area via a portal may be determined based, at least in part, on monitoring mobile devices in a given area over time. For example, likelihood values of a likelihood heat map may be based at least partly on how mobile devices move over time (e.g., how positions, velocities, trajectories, paths, inertial measurement values, or combinations thereof, etc. presage a likelihood that a mobile device is about to take a portal). Threshold values of positions, velocities, trajectories, paths, inertial measurement values, etc. that presage a likelihood that a mobile device is to transition between areas may be crowd sourced to initially establish or subsequently refine values by collecting such positions, velocities, trajectories, paths, inertial measurement values, etc. from mobile devices over time.

For certain example implementations, for a likelihood heat map, one or more indications of one or more likelihoods of transitions from a first area identifiable by a first location context identifier to a second area identifiable by a second location context identifier via one or more portals may be determined based, at least in part, on one or more features of a map of the first area and one or more locations of the one or more portals. A likelihood heat map may enable a determination of a particular likelihood that a mobile device transitions from a first area to a second area via a particular portal of one or more portals based, at least partly, on a current position of the mobile device in the first area. In example implementations, for a static heat map, one or more indications of one or more likelihoods of transitions from a first area to a second area may be determined based, at least in part, on a first location of a first portal or a second location of a second portal along at least one passageway as represented by one or more features of a map of the first area and on at least one expected foot traffic pattern along the at least one passageway. Example implementations for static heat maps are described herein below with particular reference to FIG. 5. In example implementations, for a dynamic heat map, one or more indications of one or more likelihoods of transitions from a first area to a second area may be determined based, at least in part, on historical movement of the mobile device within at least the first area. Example implementations for dynamic heat maps are described herein below with particular reference to FIG. 6.

Figure 4:
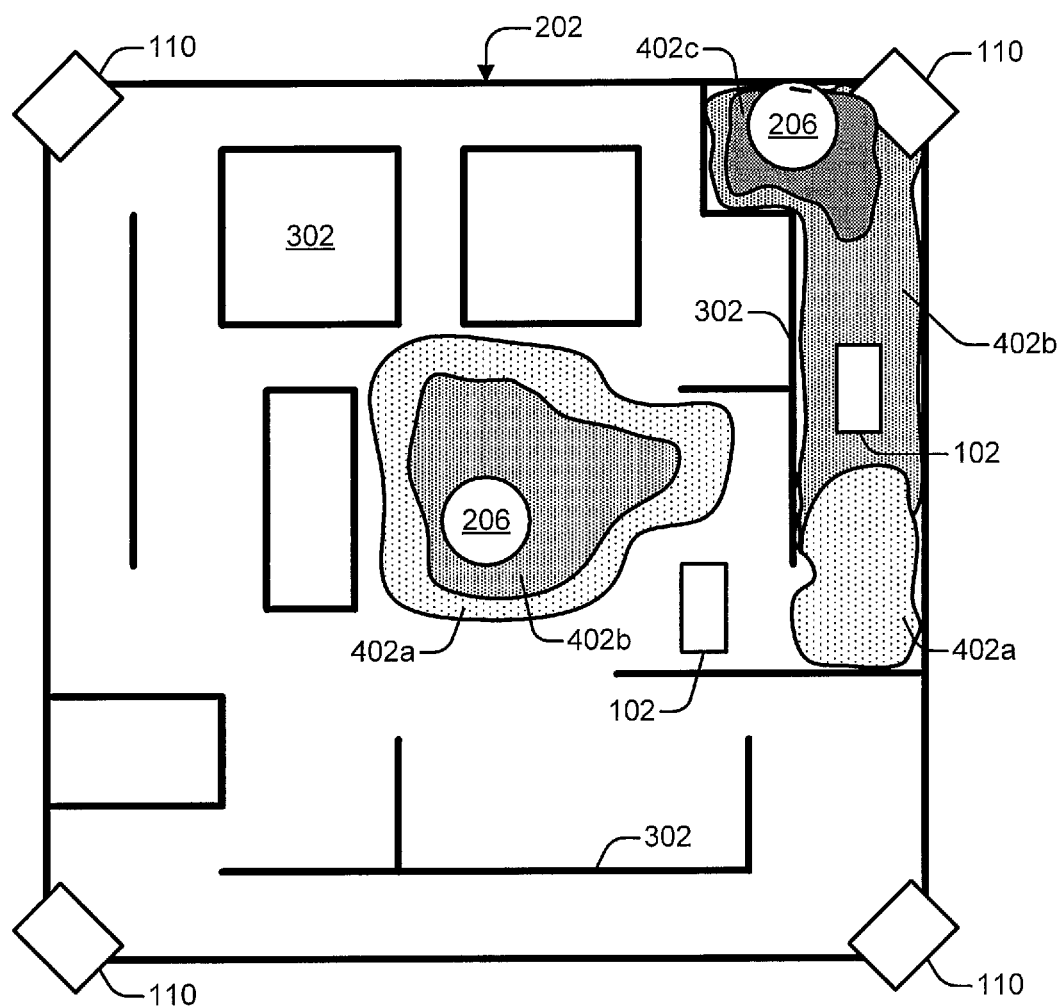
FIG. 4 illustrates a schematic map of an area in which example zones of likelihood are depicted according to an implementation.

FIG. 4 illustrates a schematic map 400 of an area in which example zones of likelihood are depicted according to an implementation. As illustrated, overlaid on schematic map 400 are multiple example zones 402 of equal likelihood. For certain example implementations, if a mobile device 102 is within a particular zone 402, there may be a corresponding likelihood, which may be acquired from an indication of a likelihood of a likelihood heat map, that the mobile device is transitioning to another area via a proximate portal 206. Zones 402a have a corresponding first likelihood. Zones 402b have a corresponding second likelihood. Zone 402c have a corresponding third likelihood.

In an example implementation, a third likelihood of zone 402c is greater than a second likelihood of zones 402b, and the second likelihood of zones 402b is greater than a first likelihood of zones 402a. It is apparent that in such an example implementation, a likelihood that a mobile device 102 is transitioning to another area via a given portal 206 may generally, but not necessarily, increase as the mobile device 102 approaches or becomes more proximate to the given portal 206. A mobile device may be considered proximate to a portal, as used herein, if a mobile device is sufficiently close to a portal that a user of the mobile device may be actually transitioning to another area via the portal or imminently capable of at least starting to transition to another area via the portal. Proximity may be determined in terms of, for example, separation distance. If an estimated position of a mobile device is within a predetermined spatial proximity threshold of a portal, then the mobile device may be considered to be proximate to the portal. Additionally or alternatively, proximity may be determined in terms of, for example, time. If an estimated position and speed of a mobile device indicates that a user may reach a portal within a predetermined temporal proximity threshold, then the mobile device may be considered to be proximate to the portal. Direction of a mobile device may also or alternatively be considered if determining proximity to a portal. However, claimed subject matter is not limited to any particular manner of determining proximity.

As described above, different positional ranges from a portal may be associated with different likelihoods or likelihood zones of a mobile device transitioning to another area via the portal. In another example implementation, different upward or downward acceleration values as measured by a mobile device may be associated with different likelihoods or likelihood zones of a mobile device transitioning to another area via a portal that is proximate to the mobile device. For example, a first vertical acceleration value may be associated with a first transition likelihood and a second, greater vertical acceleration value may be associated with a second, greater transition likelihood. As measured acceleration values increase, determined likelihoods of portal transitions may increase as well, for instance. However, claimed subject matter is not limited to any particular example approaches to using measured acceleration values to determine a likelihood that a mobile device is to transition to a different area via a portal. Furthermore, one or more other inertial sensor measurements may additionally or alternatively be used to determine a likelihood that a mobile device is to transition to a different area via a portal.

Figure 5:
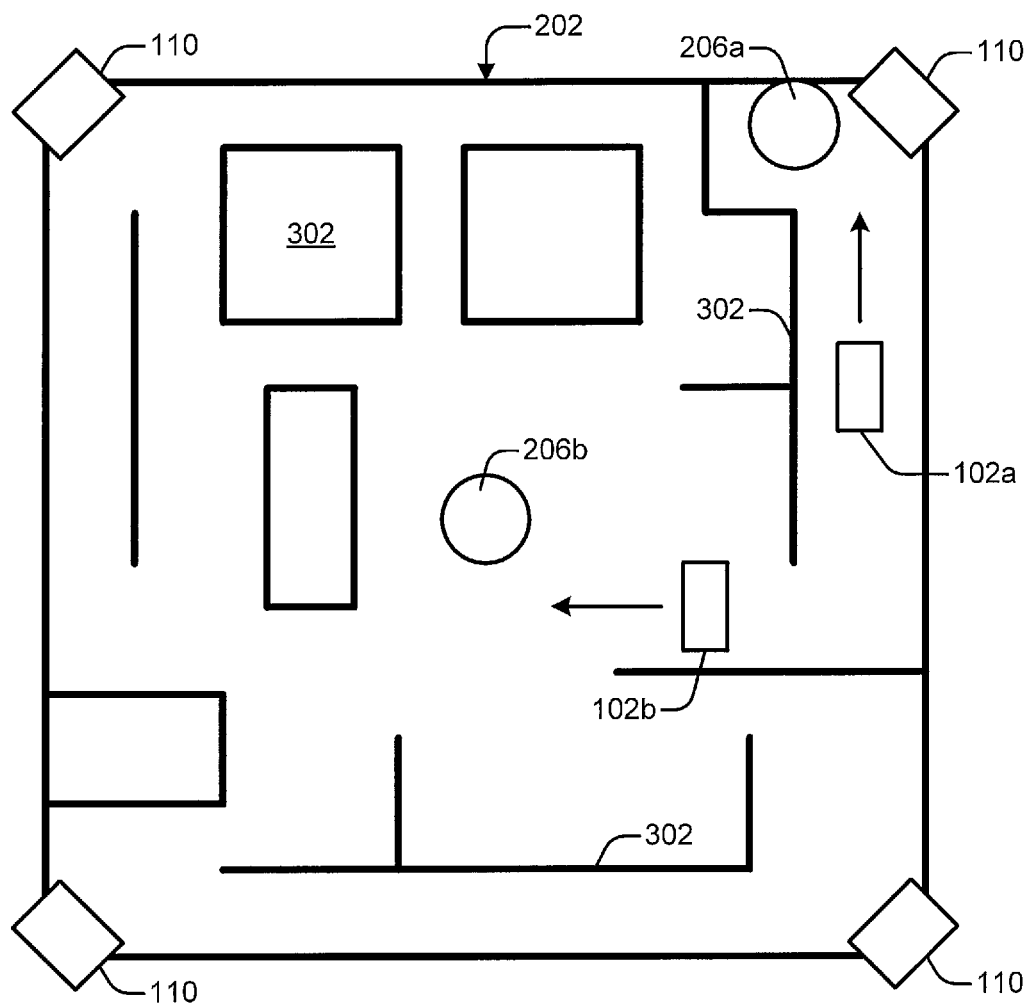
FIG. 5 depicts a schematic map to illustrate an example determination of a static likelihood heat map according to an implementation.

Example characteristics of likelihood heat maps are described herein above. Furthermore, example approaches to determining likelihood values are described herein above. Additionally, a likelihood heat map may comprise a static likelihood heat map, a dynamic likelihood heat map, a combined static and dynamic likelihood heat map, or any combination thereof. The term "static" or "dynamic", in this context, may refer to how likelihood values are determined for or to how likelihood values are used with a likelihood heat map. FIG. 5 relates to examples of a static likelihood heat map, and FIG. 6 relates to examples of a dynamic likelihood heat map.

However, claimed subject matter is not limited to any particular types of likelihood heat maps or approaches to determining them.

FIG. 5 depicts a schematic map 500 to illustrate an example determination of a static likelihood heat map according to an implementation. As illustrated, schematic map 500 may include at least a portal 206a, a portal 206b, a mobile device 102a, or a mobile device 102b. For certain example implementations, likelihood values of a static likelihood heat map may depend, at least in part, on a location of a portal or a position of a mobile device in conjunction with a layout or organization of an area 202. As illustrated, mobile device 102a and mobile device 102b are approximately equidistant from portal 206a and portal 206b, respectively.

For certain example implementations, indications of transition likelihoods may be based, at least in part, on expected foot traffic patterns along a passageway, e.g., given physical features of an area that may impact a users trajectory, path, destination, or combination thereof, etc. By way of example only, a first portal that is located at a terminating portion of a first passageway may be associated with a greater likelihood of transition in a static probability heat map as compared to a second portal that is located along a middle of or otherwise away from a terminating portion of a second passageway. As shown with respect to mobile device 102a, a user may be walking down a hallway that ends in a vicinity of portal 206a. Because there are no other points of interest down this hallway, a likelihood that mobile device 102a is transitioning to another area may be indicated to be a higher level as compared to if the hallway did not have a dead end (e.g., as compared to if a user could merely pass by portal 206a and continue along the hallway), or as compared to a likelihood that a user is to turn around to backtrack down the hallway.

In contrast, as shown with respect to a mobile device 102b, a user is walking through a central open space that may include access to portal 206b, but the central open space may also include a number of other points of interest or points of egress. Accordingly, because there are other points of interest in the illustrated central open space, a likelihood that mobile device 102b is transitioning to another area via portal 206b may be set lower relative to a likelihood that mobile device 102a is transitioning to another area via portal 206a, even though mobile device 102a and mobile device 102b are in this example approximately equidistant from portal 206a and portal 206b, respectively. However, claimed subject matter is not limited to any particular approach to determining or using a static likelihood heat map.

Figure 6:
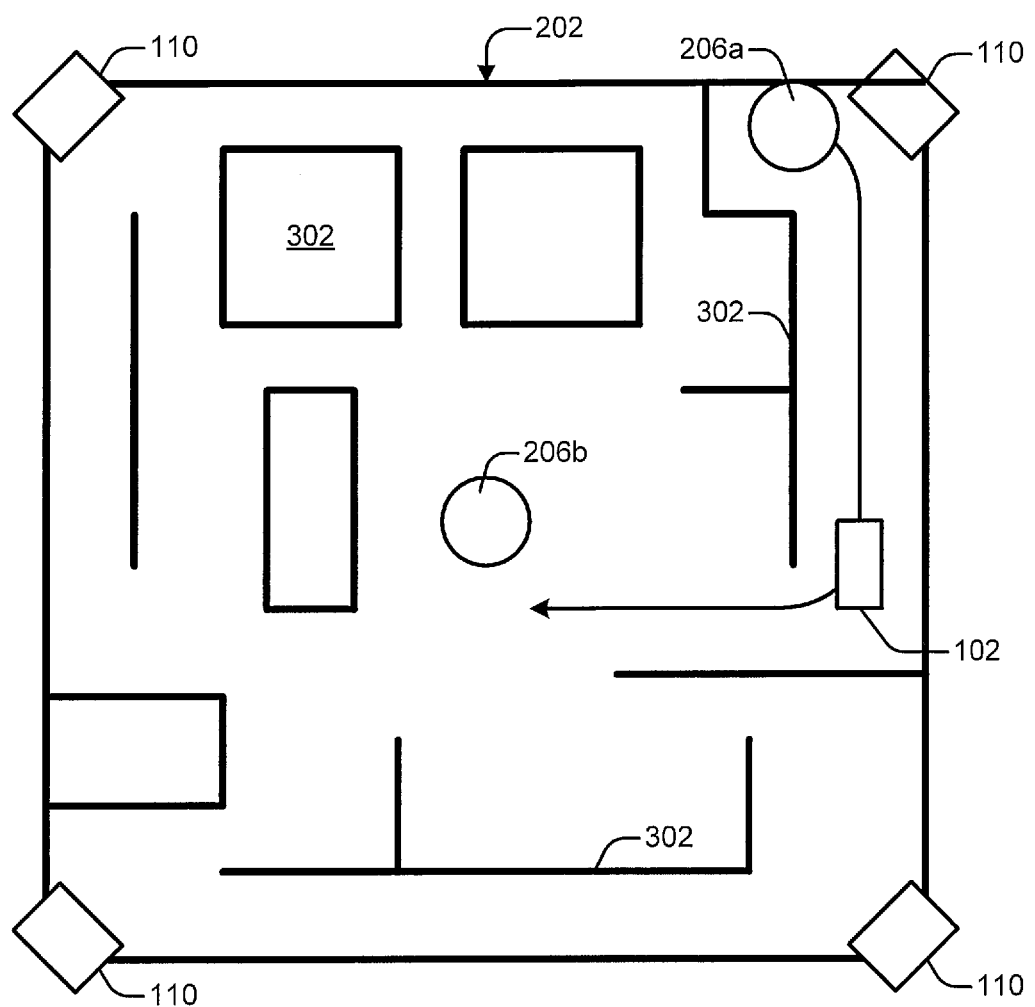
FIG. 6 depicts a schematic map to illustrate an example determination of a dynamic likelihood heat map according to an implementation.

FIG. 6 depicts a schematic map 600 to illustrate an example determination of a dynamic likelihood heat map according to an implementation. As illustrated, schematic map 600 may include at least portal a 206a, a portal 206b, or a mobile device 102. For certain example implementations, likelihood values of a dynamic likelihood heat map may be based, at least in part, on historical movement or behavior of a mobile device. As shown by an illustrated arrow path for an example scenario, mobile device 102 has recently transitioned to area 202 via portal 206a and has traveled down a hallway. Mobile device 102 is currently moving into an open space having access to portal 206b. It may be more likely that a person who recently arrived on a floor is to remain on a floor for at least a while instead of immediately or quickly (e.g., in less than a few minutes) taking another portal to a different floor. Hence, user intent to transition or not to transition to another area may be inferred from user behavior. With use of a dynamic likelihood heat map or consideration of e.g. historical movement of a mobile device, a likelihood that mobile device 102 is transitioning to another area via portal 206b in the illustrated example scenario may be lower than if historical movement is not considered.

For certain example implementations, likelihood values of a dynamic likelihood heat map may be based, at least in part, on one or more user interactions with a mobile device or on at least one point of interest that is associated with a second area or another area that is accessible via one or more portals. For example, a user's search history may pertain to points of interest that are associated with a particular other area. Transition likelihoods for the particular other area may be greater than for other areas for which no search history pertains. Additionally or alternatively, it may be observed that a user is spending time in a vicinity of a particular point of interest in a given area (e.g., women's dresses), so a transition likelihood to a first adjacent area that is associated with a same or similar point of interest (e.g., women's suits) may be indicated to be greater than a transition likelihood to a second adjacent area that is associated with a different point of interest (e.g., video games). As another example or alternative, a mobile device may monitor a user's behavior with it to detect that a user frequents a particular area. A transition likelihood to the particular area may therefore be indicated to be greater than a transition likelihood to another area. However, claimed subject matter is not limited to any particular approach to determining or using a dynamic likelihood heat map.

Figure 7:
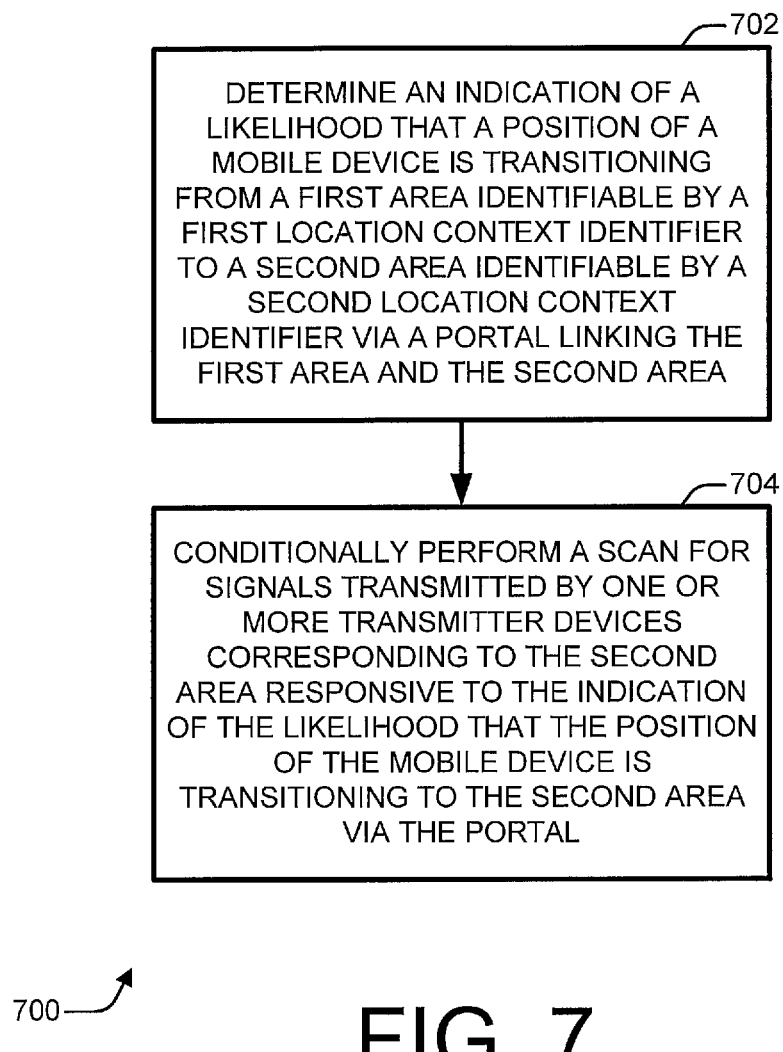
FIG. 7 is a flow diagram illustrating an example method for a mobile device to conditionally perform a scan for signals transmitted by transmitter devices responsive to a determined indication of a portal transition likelihood according to an implementation.

FIG. 7 is a flow diagram 700 illustrating an example method for a mobile device to conditionally perform a scan for signals transmitted by transmitter devices responsive to a determined indication of a portal transition likelihood according to an implementation. As illustrated, flow diagram 700 may include any of operations 702-704. Although operations 702-704 are shown and described in a particular order, it should be understood that methods may be performed in alternative manners without departing from claimed subject matter, including but not limited to, with a different order or number of operations. Also, at least some operations of flow diagram 700 may be performed so as to be fully or partially overlapping with other operation(s).

For certain example implementations, one or more of operations 702-704 may be performed at least partially by at least one mobile device. At operation 702, an indication of a likelihood that a position of a mobile device is transitioning from a first area identifiable by a first location context identifier to a second area identifiable by a second location context identifier via a portal linking the first area and the second area may be determined. At operation 704, a scan for signals transmitted by one or more transmitter devices corresponding to the second area may be conditionally performed responsive to the indication of the likelihood that the position of the mobile device is transitioning to the second area via the portal.

For certain example implementations, if an indication of a likelihood of a transition of a mobile device from a first area to a second area meets a predetermined transition likelihood threshold, then a mobile device may scan for signals transmitted by one or more wireless transmitter devices corresponding to the second area. Scanning may be used to identify wireless transmitter devices that are within range or to at least help with floor determination, but, as noted above, scanning may consume power or bandwidth resources of a mobile device. In example implementations, different scanning procedures may be used for different types of portals. A stairway or an escalator typically enables area transitions between one or two floors, such as one floor up or one floor down. If a portal comprises a stairway or an escalator, then a mobile device may download from one or more servers an identity or other attributes that is or are descriptive of one or more wireless transmitter devices that correspond to one or two adjacent floors, for example. Using downloaded description of wireless transmitter device(s), a mobile device may perform a scan in a directed probe manner for known wireless transmitter device(s), such as known APs, to conserve resources in comparison to a scan that is performed in a passive manner. A directed probe scan may be more efficient than a full passive scan across all available channels. Results of a scan that include identities of one or more wireless transmitter devices may be used locally at a mobile device or uploaded to one or more servers in order to perform a determination procedure for a floor or location context identifier. In contrast with a stairway or an escalator, an elevator may enable transitions between two floors that are far apart or that are among many floors of a building, such as a building having several dozen or more floors. If a portal comprises an elevator, then a passive scan (e.g., a full passive scan) may be performed after a user reaches a destination to determine a floor of the destination. Recognition that a user has reached a destination via an elevator ride may be inferred from, for example, one or more sensor measurement values obtained using an accelerometer, a barometer, any combination thereof, etc.

An elevator ride, especially one that traverses many floors or has many stops, may take a non-negligible amount of time. During this elevator ride, one or more radios of a mobile device may consume power without performing any desired functions. For certain example implementations, at least a portion of one or more radio subsystems may be deactivated or switched off during at least a portion of time while a mobile device is within a passenger compartment of an elevator. A radio subsystem may be reactivated or switched back on when an elevator ceases movement, after a predetermined time period has elapsed, or any combination thereof, etc. In an example implementation, a wireless transmitter device that is connected to an elevator may transmit a notification to a mobile device to fully or partially deactivate (e.g., eliminate power to, reduce power to, cease use of to at least some extent, or any combination thereof, etc.) a radio subsystem. For example, receiving of signals, transmitting of signals, processing of signals, or any combination thereof, etc. may be stopped. Additionally or alternatively, a mobile device may cease scanning for signals transmitted by wireless transmitter devices during a deactivation period. In response to receipt of a radio deactivation notification, at least mobile devices that are not otherwise using their radios may turn off e.g. a WLAN module. A radio deactivation notification may include a predetermined duration indicative of how long at least a portion of a radio subsystem of a mobile device may be turned off. A mobile device may set a timer based, at least in part, on a predetermined duration, which may be e.g. stored in the mobile device or received in a deactivation notification. After a timer expires, deactivated portion(s) or function(s) of a radio subsystem may be reactivated to, for example, perform a scan operation as part of a floor determination procedure.

Figure 8:
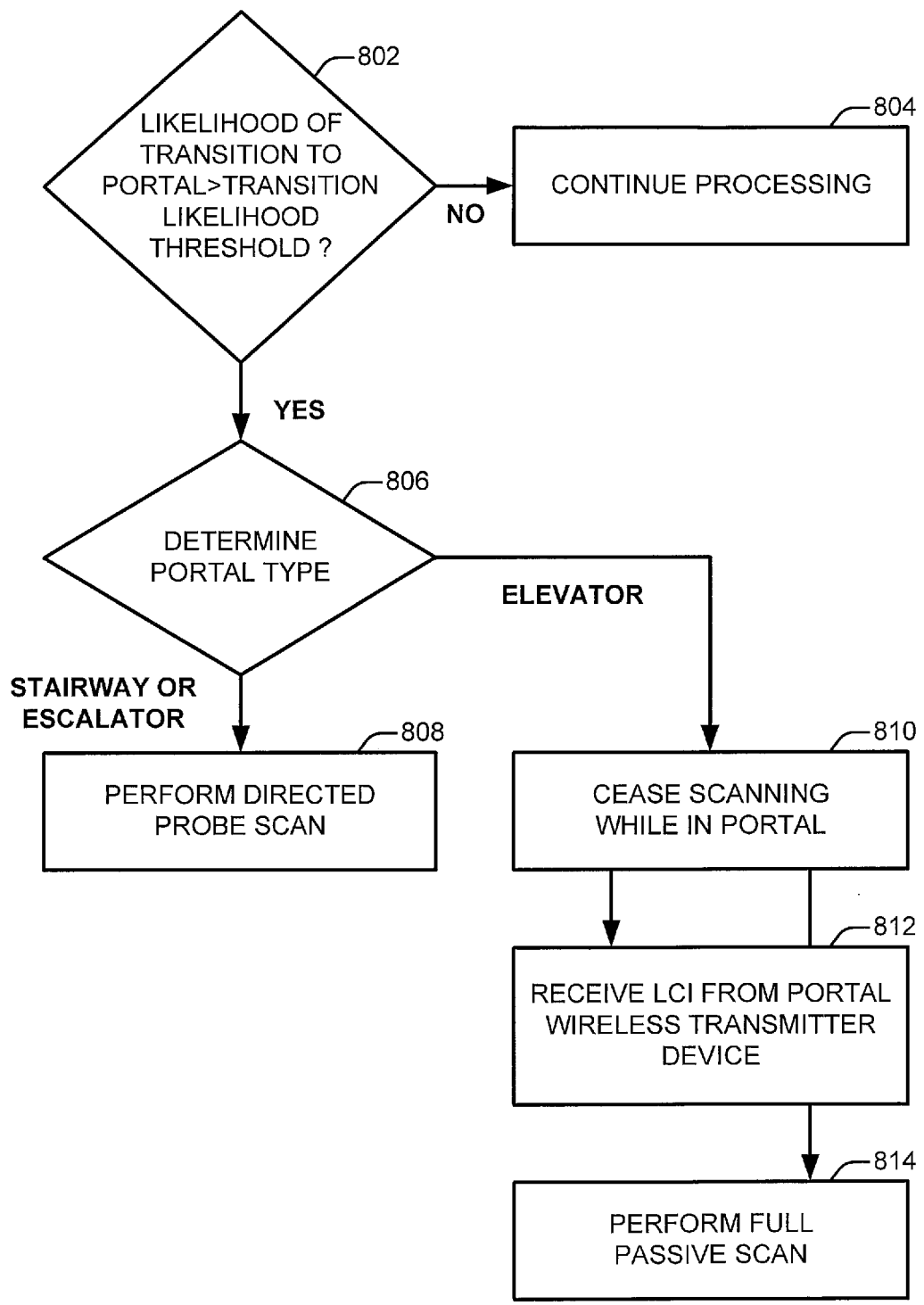
FIG. 8 is a flow diagram illustrating an example method for a mobile device to determine a type of scan to perform if transitioning via a portal from one area to a different area.

FIG. 8 is a flow diagram 800 illustrating an example method for a mobile device to determine a type of scan to perform if transitioning via a portal from one area to a different area. As illustrated, flow diagram 800 may include any of operations 802-814. Although operations 802-814 are shown and described in a particular order, it should be understood that methods may be performed in alternative manners without departing from claimed subject matter, including but not limited to, with a different order or number of operations. Also, at least some operations of flow diagram 800 may be performed so as to be fully or partially overlapping with other operation(s).

For certain example implementations, one or more of operations 802-814 may be performed at least partially by at least one mobile device. At operation 802, it may be determined if a likelihood that a mobile device is transitioning to a different area via a portal meets (e.g., is greater than, equal to, etc.) a predetermined transition likelihood threshold in a comparison including an indication of a likelihood that a position of a mobile device is transitioning via a portal and a transition likelihood threshold. If not, then at operation 804 processing may be continued. For example, another estimated position may be ascertained to determine if a mobile device is proximate to a portal.

If, on the other hand, a transition likelihood indication does meet a predetermined transition likelihood threshold, then at operation 806 a type of a portal may be determined. If a portal comprises a stairway or an escalator, then a directed probe scan may be performed at operation 808. On the other hand, if a portal comprises an elevator, then at operation 810 a mobile device may at least cease scanning for at least a portion of a time during which the mobile device is in a passenger compartment of the elevator. For example, a mobile device may acquire a signal (e.g., receive or process a signal) transmitted by a wireless transmitter device that is connected to an elevator. A mobile device may cease scanning for other signals transmitted by other wireless transmitter devices during at least a portion of a time that the mobile device is located in a passenger compartment of an elevator responsive at least to a signal acquisition.

After reaching a destination, a wireless transmitter device of an elevator may provide to the mobile device a location context identifier corresponding to an area to which a mobile device is transitioning at operation 812. Providing a location context identifier to an exiting mobile device may obviate performance of a floor determination procedure. Additionally or alternatively, a mobile device may perform a full passive scan after reaching a destination area at operation 814.

As noted above, if a mobile device enters an area, it may ascertain a location context identifier by which the area is identifiable, with the location context identifier comprising a reference that may be used to request one or more characteristics that are descriptive of the area. A mobile device may perform a full passive scan to make a floor determination absent other information. A location context identifier for an area may be ascertained based, at least in part, on one or more identifiers (e.g., MAC IDs) of wireless transmitter device(s) that are in range as detected by a scan, such as a full passive scan. A mobile device may create a list of wireless transmitter devices from which it can acquire a signal. A list of wireless transmitter devices that are in range may be compared against a database of wireless transmitter devices that correspond to different location contexts. A database may be stored locally or at a remote server device. A match may be determined based at least partially on at least one comparison. For example, a location context match may be determined based, at least in part, on a location context corresponding to a greatest number of wireless transmitter devices in common with a created list. Alternatively, a location context match above a particular threshold may be chosen in a similar fashion but be based, at least in part, on those wireless transmitter devices whose signals are detected above a particular threshold. Alternatively, a location context may be selected as a match if it corresponds to a wireless transmitter device from which a strongest signal is detected. A location context identifier that identifies a matching location context may thus be ascertained using one or more above-described approaches to matching a created list of wireless transmitter devices to a database of location contexts and corresponding wireless transmitter devices.

Additionally or alternatively, a wireless transmitter device may broadcast its position in space (e.g., latitude, longitude, or altitude) in a wireless transmitter device advertisement. A mobile device may ascertain a location context identifier for a floor based, at least in part, on an advertised position of a wireless transmitter device that is in range using an internal database or using a communication exchange with one or more remote server devices. For example, latitude and longitude of a location may be translated into a building, or altitude may be translated to a floor of a building. A tuple, {building, floor}, may be determined, which may be associated with a location context identifier. Furthermore, if a mobile device is first entering a building from ground level at a determinable location (e.g., as may be determinable from a last-known SPS-based position fix) and a building has a known floor for entry from ground level, a mobile device may perform a floor determination procedure based, at least in part, on an entry floor from ground level of a building.

Figure 9:
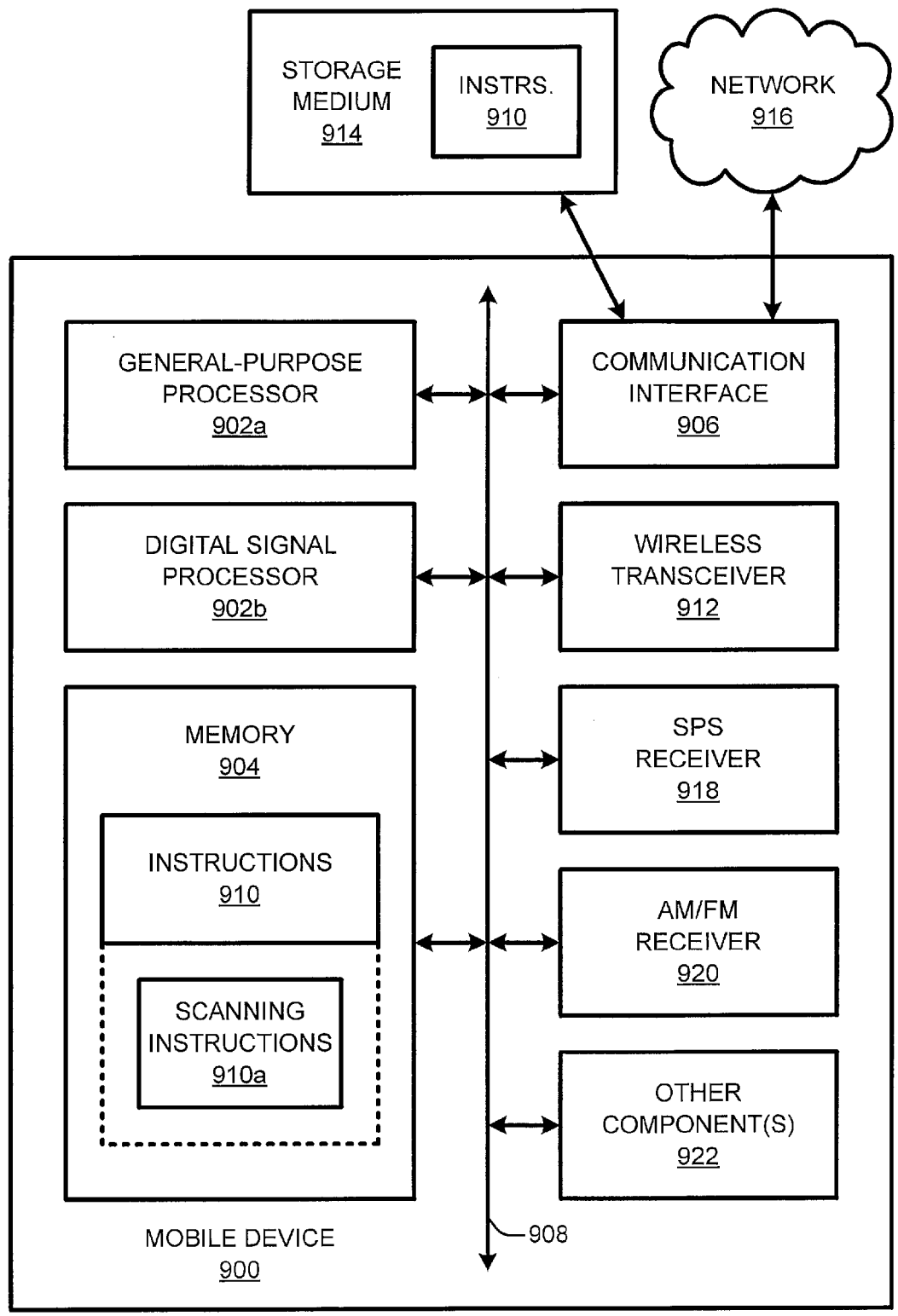
FIG. 9 is a schematic diagram illustrating an example mobile device, according to an implementation, that may implement one or more aspects relating to indications of likelihoods that a position of a mobile device is transitioning from a first area to a second area via a portal.

FIG. 9 is a schematic diagram illustrating an example mobile device 900, according to an implementation, that may implement one or more aspects relating to indications of likelihoods that a position of a mobile device is transitioning from a first area to a second area via a portal. As illustrated, mobile device 900 may include at least one processor 902 (e.g., a general-purpose processor 902a or a digital signal processor 902b), one or more memories 904, at least one communication interface 906, at least one interconnect 908, at least one wireless transceiver 912, at least one SPS receiver 918, at least one AM/FM receiver 920, or one or more other component(s) 922, or any combination thereof, etc. FIG. 9 also illustrates at least one storage medium 914 and one or more networks 916. A mobile device 900 may have access to a storage medium 914 or networks 916. Memory 904 or storage medium 914 may include instructions 910. However, a mobile device 900 may alternatively include or have access to more, fewer, or different components from those that are illustrated without departing from claimed subject matter.

For certain example implementations, a mobile device 102 (e.g., of FIGS. 1-6) may comprise a mobile device 900. Mobile device 900 may include or comprise at least one electronic device, such as a device with processing capabilities. Mobile device 900 may comprise, for example, any electronic device having at least one processor or memory. Examples of mobile devices 900 may include, but are not limited to, a notebook or laptop computer, a personal digital assistant (PDA), a netbook, a slate or tablet computer, a portable entertainment device, a mobile phone, a smart phone, a mobile terminal (MT), a mobile station (MS), a user equipment (UE), a personal navigation device (PND), or any combination thereof, etc.

One or more processors 902 may comprise one or more separate or integrated processors. As illustrated, one or more processors 902 may comprise a general-purpose processor 902a, a digital signal processor 902b, or any combination thereof, etc. General-purpose processor 902a may be programmed with instructions, such as instructions 910, to become a special purpose processor that implements at least a portion of any process(es), method(s), or procedure(s), etc. that are described herein. A digital signal processor (DSP) 902b may comprise a processor having an architecture that is at least partially enhanced to process digital signals. Digital signal processor 902b may be programmed with instructions, such as instructions 910, to become a special purpose digital signal processor that implements at least a portion of any procedure(s) that are described herein. General-purpose processor 902a or digital signal processor 902b may operate individually or jointly to implement any procedure(s) that are described herein.

Memory 904 may store, contain, or otherwise provide access to at least a portion of instructions 910 that may be executable by a processor 902. Examples for instructions 910 may include, but are not limited to: a program, or an application, etc. or portion thereof; operational data structures; processor-executable instructions; computer-implemented instructions; code or coding; or any combination thereof; etc. Execution of instructions 910 by one or more processors 902 may transform mobile device 900 into a special purpose computing device, apparatus, platform, or any combination thereof, etc.

Instructions 910 may include, by way of example but not limitation, scanning instructions 910a. In certain example implementations, scanning instructions 910a may correspond to, for example, instructions that are capable of realizing: at least a portion of one or more implementations of flow diagrams 700 or 800 (e.g., of FIG. 7 or 8), such as any of operations 702-704 or 802-814; at least a portion of any procedures shown in or described with reference to FIGS. 1-6 from a mobile device perspective; or any combination thereof; etc., just to name a couple of examples. Other alternatives may instead be implemented without departing from claimed subject matter.

At least one communication interface 906 may provide one or more hardware or software interfaces between mobile device 900 and other devices or human operators. Hence, communication interface 906 may comprise a screen, a speaker, a microphone, a camera, a keyboard or keys, or other human-device input or output features. Additionally or alternatively, a communication interface 906 may comprise a transceiver (e.g., a transmitter or a receiver), a radio, an antenna, a network interface (e.g., a wired hardware interface connector, such as a network interface card; or a wireless interface connector, such as a Bluetooth® or near field communication (NFC) unit; etc.), a local hardware interface (e.g., a universal serial bus (USB) connector, or a Light Peak® connector, etc.), or any combination thereof, etc. to communicate wireless and/or wired signals (e.g., over wireless or wired communication links) via one or more networks 916. Communications using at least one communication interface 906 may enable transmitting, receiving, or initiating of transmissions, etc., just to name a few examples.

One or more networks 916 may comprise at least one wireless or wired network. Examples of networks 916 may include, but are not limited to, a local area network (LAN), a wireless LAN (WLAN), a wide area network (WAN), a wireless WAN (WWAN), a cellular network, a telecommunications network, the internet, an ad hoc network, an infrastructure network, or any combination thereof, etc. A storage medium 914 may store, for example, at least a portion of instructions 910. A storage medium 914 may be external (as shown) to mobile device 900. If external, storage medium 914 may be local or remote from mobile device 900. An external implementation of a storage medium 914 may comprise a separate memory device or may comprise part of another electronic device. Although not so explicitly illustrated, storage medium 914 may also or alternatively be located within, or be internal to, mobile device 900. Examples of storage medium 914 may include, but are not limited to, a hard drive, a disk, a disc, a storage array, volatile memory, nonvolatile memory, a USB drive, a memory card, a computer-readable medium, or any combination thereof, etc.

Additionally or alternatively to communication interface 906, mobile device 900 may include one or more transmitters, receivers, transceivers, or any combination thereof, etc. By way of example only, a mobile device may include at least one wireless transceiver 912, at least one SPS receiver 918, at least one AM/FM receiver 920, or any combination thereof, etc. A wireless transceiver 912 may transmit or receive wireless signals in accordance with, e.g., at least one selected protocol. Example protocols may include, but are not limited to, a cellular or WWAN protocol, a Wi-Fi protocol, a Bluetooth® protocol, or any combination thereof, etc. Wireless transceiver 912 may communicate, for example, with network 916 via wireless signals. An SPS receiver 918 may at least receive SPS signals from one or more satellites, pseudolites, positioning beacons, or any combination thereof, etc. An AM/FM receiver 920 may at least receive amplitude modulated (AM) or frequency modulated (FM) signals. Although not explicitly shown in FIG. 9, wireless transceiver 912, SPS receiver 918, AM/FM receiver 920, or any combination thereof, etc. may be coupled to one or more individual antennas or shared antennas.

Mobile device 900 may include at least one interconnect 908 that comprises one or more buses, channels, switching fabrics, or combinations thereof, etc. to enable signal communication between or among components of mobile device 900. Other component(s) 922 may comprise one or more other miscellaneous sensors, power sources, apparatuses providing other feature(s), or any combination thereof, etc. In an example implementation, sensors may include, but are not limited to, a thermometer, a barometer, an accelerometer, a compass, a gyroscope, or any combination thereof, etc. Although not explicitly illustrated in FIG. 9, one or more components of mobile device 900 may be coupled to interconnect 908 via a discrete or integrated interface. By way of example only, one or more interfaces may couple wireless transceiver 912 or general-purpose processor 902a to interconnect 908.

In example implementations, a device, such as mobile device 900, may comprise at least one memory 904 and one or more processors 902. At least one memory 904 may store instructions 910. One or more processors 902 may be configured to execute instructions 910, e.g., to perform one or more procedures, processes, operations, or any combination thereof, etc. In example implementations, an article (e.g., an article of manufacture) may comprise at least one storage medium 914. At least one storage medium 914 may have stored thereon instructions 910 that are executable by one or more processors 902, e.g., to perform one or more procedures, processes, operations, or any combination thereof, etc.

Methodologies described herein may be implemented by various means depending upon applications according to particular features or examples. For example, such methodologies may be implemented in hardware, firmware, software, discrete/fixed logic circuitry, or any combination thereof, etc. In a hardware or logic circuitry implementation, for example, a processor or processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions or designed to perform functions described herein, or combinations thereof, just to name a few examples. Herein, the term "control logic" may encompass logic implemented by software, hardware, firmware, discrete/fixed logic circuitry, or any combination thereof, etc.

For a firmware or software implementation, methodologies may be implemented with modules (e.g., procedures, functions, etc.) having instructions that perform functions as described herein. Any machine readable medium tangibly embodying instructions may be used in implementing methodologies as described herein. For example, software coding may be stored in a memory or executed by a processor. Memory may be implemented within a processor or external to a processor. As used herein the term "memory" may refer to any type of long term, short term, volatile, nonvolatile, or other storage memory/medium and is not to be limited to any particular type of memory or number of memories, or type of media upon which memory is stored.

In one or more example implementations, functions described herein may be implemented in hardware, software, firmware, discrete/fixed logic circuitry, any combination thereof; etc. If implemented in firmware or software, functions may be stored on a physical computer-readable (e.g., via electrical digital signals) medium as one or more instructions or code (e.g., realized as at least one article of manufacture comprising at least one storage medium having instructions stored thereon). Computer-readable media may include physical computer storage media that may be encoded with a data structure, a computer program, or any combination thereof, etc. A storage medium may be any available physical medium that can be accessed by a computer. By way of example, and not limitation, such computer-readable media may comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, may include compact disc (CD), laser disc, optical disc, digital versatile disc (DVD), floppy disk and blu-ray disc, where disks usually reproduce data magnetically, and discs usually reproduce data optically with lasers.

Also, computer instructions, code, or data, etc. may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, or microwave. Combinations of the above may also be included within the scope of physical transmission media. Such computer instructions or data may be transmitted in portions (e.g., first and second portions) at different times (e.g., at first and second times).

Electronic devices may also operate in conjunction with Wi-Fi/WLAN or other wireless networks. For example, positioning data may be acquired via a Wi-Fi or other wireless network. In addition to Wi-Fi/WLAN signals, a wireless/mobile device may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). Furthermore, implementations described herein may be used with positioning determination systems that utilize pseudolites or a combination of satellites and pseudolites. Pseudolites may comprise ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites may be particularly useful in situations where SPS signals from an orbiting satellite might be unavailable, such as in tunnels, mines, buildings, urban canyons, or other enclosed areas. Another implementation of pseudolites is known as radio-beacons. The term "satellite", as used herein, may include pseudolites, equivalents of pseudolites, and similar or analogous technologies. The term "SPS signals", as used herein, may include SPS-like signals from pseudolites or equivalents of pseudolites. Certain implementations may also be applied to femtocells or a combination of systems that includes femtocells. For example, femtocells may provide data or voice communication. Moreover, femtocells may provide positioning data.

Hence, example implementations that are described herein may be used with various SPSs. An SPS typically includes a system of transmitters positioned to enable entities to determine their location on or above the Earth based, at least in part, on signals received from the transmitters. Such a transmitter typically, but not necessarily, transmits a signal marked with a repeating pseudo-random noise (PN) code of a set number of chips and may be located on ground based control stations, user equipment, or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein, an SPS may include any combination of one or more global and/or regional navigation satellite systems or augmentation systems, and SPS signals may include SPS, SPS-like, or other signals associated with one or more SPS.

Network or networks may operate in accordance with any one or more of many different systems, standards, or protocols, etc., just to name a few examples. For example, for an implementation including at least one wireless communication network, such wireless communication network(s) may comprise one or more of a wireless wide area network (WWAN), a wireless local area network (WLAN), a wireless personal area network (WPAN), any combination thereof, and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination thereof, and so on. A CDMA network may implement one or more radio access technologies (RATs) such as cdma2000, Wideband-CDMA (W-CDMA), Time Division Synchronous Code Division Multiple Access (TD-SCDMA), or any combination thereof, etc., just to name a few radio technology examples. Here, cdma2000 may include technologies implemented according to IS-95 standards, IS-2000 standards, IS-856 standards, or any combination thereof, etc. A TDMA network may implement Global System for Mobile Communications (GSM), Digital Advanced Mobile Phone System (D-AMPS), or some other RAT or RATs. GSM and W-CDMA examples are described in documents from a consortium named "3rd Generation Partnership Project" (3GPP). Cdma2000 examples are described in documents from a consortium named "3rd Generation Partnership Project 2" (3GPP2). 3GPP and 3GPP2 documents are publicly available. A WLAN may include an IEEE 802.11x network, and a WPAN may include a Bluetooth network or an IEEE 802.15x network, just to name a few examples. Wireless communication networks may include so-called next generation technologies (e.g., "4G"), such as, for example, Long Term Evolution (LTE), Advanced LTE, WiMAX, Ultra Mobile Broadband (UMB), or any combination thereof, or the like.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software or instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing may involve physical manipulation of physical quantities. Typically, although not necessarily, such quantities may take the form of electrical or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "acquiring", "performing," "applying," "predicting", "positioning/locating," "storing," "providing," "making", "ceasing", "demodulating", or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Likewise, the terms, "and" and "or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic, etc. in the singular or may be used to describe some combination of features, structures, or characteristics, etc. However, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method for a mobile device, the method comprising:
    obtaining an estimate of a location of said mobile device, the estimated location of said mobile device being in a first area identifiable by a first location context identifier;
    determining an indication of a probability that the mobile device subsequently transitions from said first area to a second area at a subsequent moment, said second area identifiable by a second location context identifier via a portal linking the first area and the second area, wherein said determination is based at least in part on a likelihood heat map;
    applying a threshold to said indication of said probability; and
    conditionally performing a scan for signals transmitted by one or more transmitter devices corresponding to the second area responsive to said application of said threshold to the indication of the probability that the mobile device subsequently transitions to the second area via the portal.

2. The method of claim 1, wherein the first area comprises one floor, and the second area comprises another floor; and wherein the portal is selected from a group comprising: a stairway, an escalator, or an elevator.

3. The method of claim 1, wherein said determining the indication of the probability that the mobile device subsequently transitions from the first area to the second area via the portal comprises: predicting one or more likely positions of the mobile device in the first area.

4. The method of claim 1, wherein said likelihood heat map corresponds to at least a portion of the first area, wherein the likelihood heat map is indicative of one or more probabilities that a mobile device subsequently transitions from the first area to the second area via the portal.

5. The method of claim 4, wherein said obtaining the indication of the probability that the mobile device subsequently transitions further comprises: obtaining the indication of the probability that the mobile device subsequently transitions based, at least in part, on the obtained estimate of the location of the mobile device.

6. The method of claim 4, wherein said obtaining the indication of the probability that the mobile device subsequently transitions further comprises:
    obtaining the indication of the probability that the mobile device subsequently transitions based, at least in part, on a history of movement of the mobile device.

7. The method of claim 1, wherein said determining the indication of the probability that the mobile device subsequently transitions from the first area to the second area via the portal comprises: obtaining at least one inertial measurement value.

8. The method of claim 1, wherein said conditionally performing the scan for the signals transmitted by the one or more transmitter devices comprises: performing the scan for the signals transmitted by the one or more transmitter devices corresponding to the second area based, at least in part, on a type of the portal.

9. The method of claim 8, wherein said performing the scan further comprises: performing the scan for the signals transmitted by the one or more transmitter devices corresponding to the second area in a passive manner if the type of the portal comprises an elevator type.

10. The method of claim 8, wherein said performing the scan further comprises: performing the scan for the signals transmitted by the one or more transmitter devices corresponding to the second area in a directed probe manner if the type of the portal comprises an escalator type or a stairway type.

11. The method of claim 1, further comprising: if the portal comprises an elevator, ceasing scanning for other signals transmitted by other transmitter devices during at least a portion of a time that the mobile device is located in a passenger compartment of the elevator.

12. The method of claim 1, wherein the portal comprises an elevator; and wherein the method further comprises: acquiring at least one signal from a transmitter device that is connected to the elevator; and ceasing scanning for other signals transmitted by other transmitter devices during at least a portion of a time that the mobile device is located in a passenger compartment of the elevator responsive at least to said acquiring of the at least one signal from the transmitter device that is connected to the elevator.

13. The method of claim 1, further comprising: ascertaining the first location context identifier by which the first area is identifiable, the first location context identifier comprising a reference to request one or more characteristics that are descriptive of the first area.

14. The method of claim 13, wherein said ascertaining further comprises: ascertaining the first location context identifier based, at least partly, on at least one medium access control identifier (MAC ID) that is received from at least one transmitter device that corresponds to the first area.

15. The method of claim 13, wherein said ascertaining further comprises: ascertaining the first location context identifier based, at least partly, on a location that is advertised by at least one transmitter device.

16. The method of claim 13, wherein said ascertaining further comprises: ascertaining the first location context identifier based, at least partly, on an entry floor of a building.

17. A mobile device for using a probability of a portal transition, the mobile device comprising:
    at least one memory to store instructions;
    a receiver; and
    one or more processors to execute said instructions to:
    obtain an estimate of a location of said mobile device, the estimated location of said mobile device being in a first area identifiable by a first location context identifier;

determine an indication of a probability that the mobile device subsequently transitions from said first area to a second area at a subsequent moment, said second area identifiable by a second location context identifier via a portal linking the first area and the second area, wherein said determination is based at least in part on a likelihood heat map;

apply a threshold to said indication of said probability; and conditionally perform a scan at said receiver for signals transmitted by one or more transmitter devices corresponding to the second area responsive to said application of said threshold to the indication of the probability that the mobile device subsequently transitions to the second area via the portal.

18. The mobile device of claim 17, wherein the first area comprises one floor, and the second area comprises another floor; and wherein the portal is selected from a group comprising: a stairway, an escalator, or an elevator.

19. The mobile device of claim 17, wherein to determine the indication of the probability that the mobile device subsequently transitions from the first area to the second area via the portal said one or more processors are further to execute said instructions to: predict one or more likely positions of the mobile device in the first area.

20. The mobile device of claim 17, wherein said likelihood heat map corresponds to at least a portion of the first area, wherein the likelihood heat map is indicative of one or more probabilities that a mobile device subsequently transitions from the first area to the second area via the portal.

21. The mobile device of claim 20, wherein to obtain the indication of the probability that the mobile device subsequently transitions said one or more processors are further to execute said instructions to: obtain the indication of the probability that the mobile device subsequently transitions based, at least in part, on said obtained estimate of the location of the mobile device.

22. The mobile device of claim 20, wherein to obtain the indication of the probability that the mobile device subsequently transitions said one or more processors are further to execute said instructions to: obtain the indication of the probability that the mobile device subsequently transitions based, at least in part, on a history of movement of the mobile device.

23. The mobile device of claim 17, wherein to determine the indication of the probability that the mobile device subsequently transitions from the first area to the second area via the portal said one or more processors are further to execute said instructions to: obtain at least one inertial measurement value.

24. The mobile device of claim 17, wherein to conditionally perform the scan at said receiver for the signals transmitted by the one or more transmitter devices said one or more processors are further to execute said instructions to: perform the scan at said receiver for the signals transmitted by the one or more transmitter devices corresponding to the second area based, at least in part, on a type of the portal.

25. The mobile device of claim 24, wherein to perform the scan said one or more processors are further to execute said instructions to: perform the scan at said receiver for the signals transmitted by the one or more transmitter devices corresponding to the second area in a passive manner if the type of the portal comprises an elevator type.

26. The mobile device of claim 24, wherein to perform the scan said one or more processors are further to execute said instructions to: perform the scan at said receiver for the signals transmitted by the one or more transmitter devices corresponding to the second area in a directed probe manner if the type of the portal comprises an escalator type or a stairway type.

27. The mobile device of claim 17, wherein said one or more processors are further to execute said instructions to: cease scanning for other signals transmitted by other transmitter devices during at least a portion of a time that the mobile device is located in a passenger compartment of an elevator if the portal comprises the elevator.

28. The mobile device of claim 17, wherein the portal comprises an elevator; and wherein said one or more processors are further to execute said instructions to: acquire at least one signal from a transmitter device that is connected to the elevator; and cease scanning for other signals transmitted by other transmitter devices during at least a portion of a time that the mobile device is located in a passenger compartment of the elevator responsive at least to said acquiring of the at least one signal from the transmitter device that is connected to the elevator.

29. The mobile device of claim 17, wherein said one or more processors are further to execute said instructions to: ascertain the first location context identifier by which the first area is identifiable, the first location context identifier comprising a reference to request one or more characteristics that are descriptive of the first area.

30. The mobile device of claim 29, wherein to ascertain the first location context identifier by which the first area is identifiable said one or more processors are further to execute said instructions to: ascertain the first location context identifier based, at least partly, on at least one medium access control identifier (MAC ID) that is received from at least one transmitter device that corresponds to the first area.

31. The mobile device of claim 29, wherein to ascertain the first location context identifier by which the first area is identifiable said one or more processors are further to execute said instructions to: ascertain the first location context identifier based, at least partly, on a location that is advertised by at least one transmitter device.

32. The mobile device of claim 29, wherein to ascertain the first location context identifier by which the first area is identifiable said one or more processors are further to execute said instructions to: ascertain the first location context identifier based, at least partly, on an entry floor of a building.

33. A mobile device for using a probability of a portal transition, the mobile device comprising:

means for obtaining an estimate of a location of said mobile device, the estimated location of said mobile device being in a first area identifiable by a first location context identifier;

means for determining an indication of a probability that the mobile device subsequently transitions from said first area identifiable to a second area at a subsequent moment, said second area identifiable by a second location context identifier via a portal linking the first area and the second area, wherein said determination is based at least in part on a likelihood heat map;

means for applying a threshold to said indication of said probability; and means for conditionally performing a scan for signals transmitted by one or more transmitter devices corresponding to the second area responsive to said application of said threshold to the indication of the probability that the mobile device subsequently transitions to the second area via the portal.

34. The mobile device of claim 33, wherein said likelihood heat map corresponds to at least a portion of the first area, wherein the likelihood heat map is indicative of one or more probabilities that a mobile device subsequently transitions from the first area to the second area via the portal.

35. The mobile device of claim 33, wherein said means for determining the indication of the probability that the mobile device subsequently transitions from the first area to the second area via the portal comprises: means for obtaining at least one inertial measurement value.

36. The mobile device of claim 33, wherein said means for conditionally performing the scan for the signals transmitted by the one or more transmitter devices comprises: means for performing the scan for the signals transmitted by the one or more transmitter devices corresponding to the second area based, at least in part, on a type of the portal.

37. An article comprising: at least one non-transitory storage medium having stored thereon instructions executable by one or more processors of a mobile device to:
 obtain an estimate of a location of said mobile device, the estimated location of said mobile device being in a first area identifiable by a first location context identifier;
 determine an indication of a probability that a mobile device subsequently transitions from said first area to a second area at a subsequent moment, said second area identifiable by a second location context identifier via a portal linking the first area and the second area, wherein said determination is based at least in part on a likelihood heat map;
 apply a threshold to said indication of said probability; and
 conditionally perform a scan for signals transmitted by one or more transmitter devices corresponding to the second area responsive to said application of said threshold to the indication of the probability that the mobile device subsequently transitions to the second area via the portal.

38. The article of claim 37, wherein said likelihood heat map corresponds to at least a portion of the first area, wherein the likelihood heat map is indicative of one or more that a mobile device subsequently transitions from the first area to the second area via the portal.

39. The article of claim 37, wherein to determine the indication of the probability that the mobile transitions from the first area to the second area via the portal said instructions stored on said at least one storage medium are further executable by the one or more processors to: obtain at least one inertial measurement value.

40. The article of claim 37, wherein to conditionally perform the scan for the signals transmitted by the one or more transmitter devices said instructions stored on said at least one storage medium are further executable by the one or more processors to: perform the scan for the signals transmitted by the one or more transmitter devices corresponding to the second area based, at least in part, on a type of the portal.

41. A method, at a computing platform, comprising:
 accessing a non-transitory storage medium to obtain one or more features of a map of a first area identifiable by a first location context identifier;
 determining one or more indications of probabilities of transitions from a first area identifiable by a first location context identifier to a second area identifiable by a second location context identifier via one or more portals, said transitions being at a subsequent moment, and said determination being based, at least in part, on said obtained one or more features of said and one or more locations of the one or more portals and on a likelihood heat map,
 wherein the one or more indications of probabilities of transitions enable a determination of a particular probability that a mobile device transitions from the first area to the second area via a particular portal of the one or more portals based, at least partly, on a current position of the mobile device in the first area.

42. The method of claim 41, wherein the one or more portals comprise at least a first portal and a second portal; and wherein said determining further comprises: determining the one or more indications of the one or more probabilities of transitions based, at least in part, on a first location of the first portal and a second location of the second portal along at least one passageway as represented by the one or more features of the map and on at least one expected foot traffic pattern along the at least one passageway.

43. The method of claim 41, wherein said determining further comprises: determining the one or more indications of the one or more probabilities of transitions based, at least in part, on one or more user interactions with the mobile device and on at least one point of interest that is associated with the second area or with another area that is accessible via the one or more portals.

44. The method of claim 41, wherein said determining further comprises: determining the one or more indications of the one or more probabilities of transitions based, at least in part, on historical movement of the mobile device within at least the first area.

45. A device for determining a heat map, the device comprising:
 at least one memory to store instructions; and
 one or more processors to execute said instructions to:
 access a non-transitory storage medium to obtain one or more features of a map of a first area identifiable by a first location context identifier;
 determine one or more indications of one or more probabilities of transitions from a first area identifiable by a first location context identifier to a second area identifiable by a second location context identifier, said transitions being at a subsequent moment and being via one or more portals, said determination being based, at least in part, on said one or more features of said map of the first area and one or more locations of the one or more portals and on a likelihood heat map,
 wherein the one or more indications of probabilities of transitions enable a determination of a particular probability that a mobile device transitions from the first area to the second area via a particular portal of the one or more portals based, at least partly, on a current position of the mobile device in the first area.

46. The mobile device of claim 45, wherein the one or more portals comprise at least a first portal and a second portal; and wherein to determine the one or more indications of the one or more probabilities of transitions said one or more processors are further to execute said instructions to: determine the one or more indications of the one or more probabilities of transitions based, at least in part, on a first location of the first portal and a second location of the second portal along at least one passageway as represented by the one or more features of the map and on at least one expected foot traffic pattern along the at least one passageway.

47. The mobile device of claim 45, wherein to determine for the one or more indications of the one or more probabilities of transitions said one or more processors are further to execute said instructions to: determine the one or more indications of the one or more probabilities of transitions based, at least in part, on one or more user interactions with the mobile device and on at least one point of interest that is associated with the second area or with another area that is accessible via the one or more portals.

48. The mobile device of claim 45, wherein to determine the one or more indications of the one or more probabilities of transitions said one or more processors are further to execute said instructions to: determine the one or more indications of the one or more probabilities of transitions based, at least in part, on historical movement of the mobile device within at least the first area.

49. A device for determining a heat map, the device comprising:
 means for determining the heat map for an indoor environment having at least a first area identifiable by a first location context identifier and a second area identifiable by a second location context identifier; and
 means for determining for the one or more indications of one or more probabilities of transitions from the first area to the second area at a subsequent moment, said transitions being via one or more portals, said determination being based, at least in part, on one or more features of a map of the first area and one or more locations of the one or more portals, wherein the heat map enables a determination of a particular probability that a mobile device transitions from the first area to the second area via a particular portal of the one or more portals based, at least partly, on a current position of the mobile device in the first area.

50. An article comprising:
 at least one non-transitory storage medium having stored thereon instructions executable by one or more processors to:
 determine one or more indications of one or more probabilities of transitions from a first area identifiable by a first location context identifier to a second area identifiable by a second location context identifier, said transitions being at a subsequent moment and being via one or more portals, said determination being based, at least in part, on one or more features of a map of the first area and one or more locations of the one or more portals and on a likelihood heat map,
 wherein the one or more indications of one or more probabilities of transitions enable a determination of a particular probability that a mobile device transitions from the first area to the second area via a particular portal of the one or more portals based, at least partly, on a current position of the mobile device in the first area.

* * * * *